(12) United States Patent
Spilka et al.

(10) Patent No.: US 10,506,014 B2
(45) Date of Patent: Dec. 10, 2019

(54) SYSTEM AND METHOD FOR DETERMINING QUALITY OF A MEDIA STREAM

(71) Applicant: SANDVINE INCORPORATED ULC, Waterloo (CA)

(72) Inventors: Keir Nikolai Spilka, London (CA); Darrell Reginald May, Waterloo (CA)

(73) Assignee: SANDVINE CORPORATION, Vancouver, BC (CA)

( * ) Notice: Subject to any disclaimer, the term of this patent is extended or adjusted under 35 U.S.C. 154(b) by 109 days.

(21) Appl. No.: 15/785,503

(22) Filed: Oct. 17, 2017

(65) Prior Publication Data

US 2018/0109587 A1   Apr. 19, 2018

Related U.S. Application Data

(60) Provisional application No. 62/410,058, filed on Oct. 19, 2016.

(51) Int. Cl.
| | |
|---|---|
| *G06F 13/00* | (2006.01) |
| *H04L 29/06* | (2006.01) |
| *H04N 21/24* | (2011.01) |
| *H04N 21/234* | (2011.01) |
| *H04N 1/00* | (2006.01) |

(52) U.S. Cl.
CPC .......... *H04L 65/80* (2013.01); *H04L 65/4069* (2013.01); *H04L 65/4084* (2013.01); *H04L 65/4092* (2013.01); *H04L 65/601* (2013.01); *H04N 21/23406* (2013.01); *H04N 21/2401* (2013.01); *H04N 1/0001* (2013.01); *H04N 1/00042* (2013.01)

(58) Field of Classification Search
CPC . H04L 65/4069; H04L 65/4084; H04L 65/80; H04L 65/601; H04L 65/4092; H04N 21/23406; H04N 21/2401; H04N 1/00042; H04N 1/0001
USPC ................. 709/231, 232–235, 224, 213, 214
See application file for complete search history.

(56) References Cited

U.S. PATENT DOCUMENTS

| | | | |
|---|---|---|---|
| 8,351,762 B2 * | 1/2013 | Kim ................. | H04N 21/44004 386/201 |
| 9,178,633 B2 * | 11/2015 | Kordasiewicz ........ | H04H 60/33 |
| 9,191,284 B2 * | 11/2015 | Kordasiewicz ..... | H04L 65/1083 |
| 9,485,298 B2 * | 11/2016 | Joch ................... | H04N 21/2401 |
| 9,774,910 B2 * | 9/2017 | Chen .................. | H04L 65/1076 |

(Continued)

*Primary Examiner* — Kenneth R Coulter
(74) *Attorney, Agent, or Firm* — Gowling WLG (Canada) LLP; Neil W. Henderson

(57) ABSTRACT

A method for determining the quality of a media stream of a computer network including: receiving a packet from a traffic flow; determining whether the packet relates to a media stream; if the packet is related to the media stream, simulating a content player buffer related to the media stream; reviewing further data chunks associated with the media stream to determine quality events affecting the media stream; analyzing the effect of the quality event on a subscriber viewing the quality event; and determining a Quality of Experience score related to the media stream; otherwise allowing the packet to continue to the subscriber without further analysis. A system for determining the quality of a media stream, the system including modules configured to carry out the method for determining the quality of the media stream.

18 Claims, 17 Drawing Sheets

(56) References Cited

U.S. PATENT DOCUMENTS

| | | | |
|---|---|---|---|
| 2008/0205856 A1* | 8/2008 | Kim | H04N 21/44004 386/290 |
| 2012/0110167 A1* | 5/2012 | Joch | H04N 21/2401 709/224 |
| 2013/0041998 A1* | 2/2013 | Kordasiewicz | H04H 60/33 709/224 |
| 2014/0298366 A1* | 10/2014 | Chen | H04L 65/1076 725/14 |
| 2015/0026309 A1* | 1/2015 | Radcliffe | H04L 65/602 709/219 |
| 2015/0195578 A1* | 7/2015 | Chen | H04N 21/234327 375/240.26 |
| 2016/0366202 A1* | 12/2016 | Phillips | H04L 43/08 |

* cited by examiner

SYSTEM AND METHOD FOR DETERMINING QUALITY OF A MEDIA STREAM

REFERENCE TO RELATED APPLICATION(S)

This document is a formal application based on and claiming the benefit of provisional application No. 62/410,058, filed Oct. 19, 2016, which is hereby incorporated herein by reference.

FIELD

The present disclosure relates generally to media streaming over a computer network. More particular, the present disclosure relates to a system and method for determining Quality of Experience (QoE) of a media stream on a computer network.

BACKGROUND

Internet subscribers have a certain expectation of the quality of their experience using the Internet, whether the subscriber is reviewing web pages or streaming video. With video streaming representing a greater and greater share of Internet traffic, there are often issues with network and provider capability and capacity to deliver video at a quality level that is acceptable to the subscriber. When video quality degrades or is experienced at a lower quality level than is expected, subscribers may complain and may look to other providers to satisfy their Internet connection needs.

As QoE is traditionally considered a subjective measure, it is difficult to properly quantify. Relying on subscribers' opinions and scoring may not be an achievable solution as it may be unavailable and insufficient. Even if subscriber opinion could be obtained easily, a content provider generally cannot wait for subscribers' input to fix a problem in the network, because for each subscriber who complains, many more experience the problem and may simply switch providers because subscribers who are unhappy with their service are more likely to switch providers. Switching providers, or "customer churn", creates a high cost for the content provider and content providers typically try and avoid customer churn.

As Internet traffic becomes more congested and more complex, there remains a need for improved systems and methods for determining the quality of media streaming in a computer network.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for determining the quality of a media stream of a computer network including: receiving a packet from a traffic flow; determining whether the packet relates to a media stream; if the packet is related to the media stream, simulating a content player buffer related to the media stream; reviewing further data chunks associated with the media stream to determine quality events affecting the media stream; analyzing the effect of the quality event on a subscriber viewing the quality event; and determining a Quality of Experience score related to the media stream; otherwise allowing the packet to continue to the subscriber without further analysis.

In a particular case, the quality event includes an event that is perceivable to the subscriber while viewing the media stream.

In another particular case, the quality event may be a stall, a bitrate change, a stop, a pause or a seek in the media stream.

In yet another particular case, determining a quality event includes: determining a stall event comprising: determining an amount of the media stream already played; determining when the buffer related to the media stream has emptied; determining when the media streams restarts playing.

In still another particular case, determining when the media stream restarts playing includes: determining when the buffer has accumulated sufficient data chunks to resume playing.

In still yet another particular case, determining a quality event includes: determining a pause or stop event comprising: determining when the buffer has reached capacity; reviewing whether the content player requests further data chunk; if no further data is requested, monitoring the content player for the next data chunk request; once a new data chunk is requested, calculating the length of time between the last data chunk request and the new data chunk request; and determining the length of the pause; otherwise, continuing to monitor the data chunk requests from the content player.

In a particular case, determining a quality event includes: determining a bitrate change comprising: determining a target bitrate; determining a bitrate of a new data chunk received by the content player; determining if the bitrate of the new data chunk is beyond a predetermined threshold away from the target bitrate; if the new data chunk is beyond a predetermined threshold away then determining there was a bitrate change, otherwise determining that there was not a bitrate change.

In another particular case, the predetermined threshold is 1.5 times the target bitrate.

In still another particular case, the target bitrate is determined by reviewing the instantaneous bitrate of at least two data chunks of the associated media stream.

In yet another particular case, the method may include determining device attributes of the device receiving the media stream and determining the Quality of Experience score based on the device attributes.

In another aspect there is provided a system for determining the quality of a media stream of a computer network, the system including: a media stream recognition module configured to receive a packet from a traffic flow and determine whether the packet relates to a media stream; an event handler configured to simulate a content player buffer related to the media stream, wherein simulating the content player buffer comprises: reviewing further data chunks associated with the media stream to determine quality events affecting the media stream; and analyzing the effect of the quality event on a subscriber viewing the quality event; and a quality calculation module configured to determine a Quality of Experience score related to the media stream.

In a particular case, the quality event includes an event that is perceivable to the subscriber while viewing the media stream.

In another particular case, the quality event may be a stall, a bitrate change, a stop, a pause or a seek in the media stream.

In still another particular case, the event handler includes a buffer simulation module configured to determine a stall event, wherein determining the stall event comprising: determining an amount of the media stream already played; determining when the buffer related to the media stream has emptied; determining when the media streams restarts playing.

In yet another particular case, determining when the media stream restarts playing includes: determining when the buffer has accumulated sufficient data chunks to resume playing.

In still yet another particular case, the event handler includes a pause/stop detection module configured to determine a pause or stop event, wherein determining the pause or stop event comprising: determining when the buffer has reached capacity; reviewing whether the content player requests further data chunk; if no further data is requested, monitoring the content player for the next data chunk request; once a new data chunk is requested, calculating the length of time between the last data chunk request and the new data chunk request; and determining the length of the pause; otherwise, continuing to monitor the data chunk requests from the content player.

In a particular case, the event handler is further configured to determine a bitrate change, wherein determining the bitrate change comprises: determining a target bitrate; determining a bitrate of a new data chunk received by the content player; determining if the bitrate of the new data chunk is beyond a predetermined threshold away from the target bitrate; if the new data chunk is beyond a predetermined threshold away then determining there was a bitrate change, otherwise determining that there was not a bitrate change.

In still another particular case, the predetermined threshold is 1.5 times the target bitrate.

In yet another particular case, the target bitrate is determined by reviewing the instantaneous bitrate of at least two data chunks of the associated media stream.

In still yet another particular case, the system may further include a device identification module configured to determine device attributes of the device receiving the media stream and determining the Quality of Experience score based on the device attributes.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
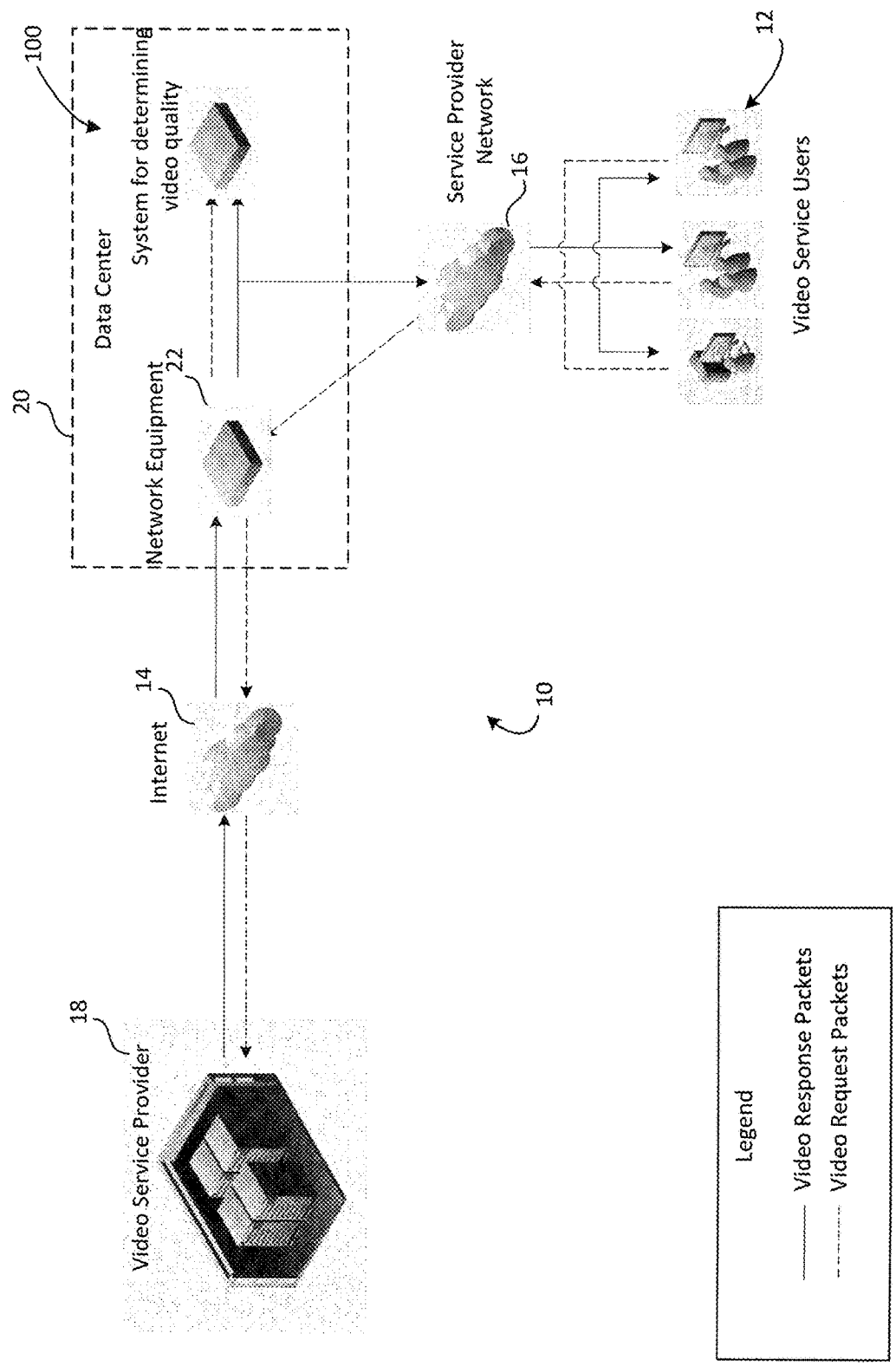
FIG. 1 is an example environment for a system for determining video quality.

The following description, with reference to the accompanying drawings, is provided to assist in understanding various example embodiments. The following description includes various specific details to assist in that understanding but these are to be regarded as merely examples. Accordingly, those of ordinary skill in the art will recognize that various changes and modifications of the embodiments described herein can be made without departing from the scope and spirit of the invention as defined by the claims and their equivalents. In addition, descriptions of well-known functions and constructions may be omitted for clarity and conciseness.

The terms and words used in the following description and claims are not limited to the bibliographical meanings, but, are merely used to enable a clear and consistent understanding. Accordingly, it should be apparent to those skilled in the art that the following description of embodiments is provided for illustration purposes and not for the purpose of limiting the invention as defined by the appended claims and their equivalents.

As content providers continue to embrace encryption, it becomes more and more difficult to estimate the end user's Quality of Experience (QoE) of content provided through networks such as the Internet. The metadata that conventional methods have generally relied on to determine the parameters of a video (resolution, codec, etc.) are now encrypted, making it more difficult to determine what an end user is viewing. In fact, besides the Server Name Indication (SNI) and the Uniform Resource Locator (URL) itself, most data which reveals insight into the content itself tends to now be encrypted.

However, by making use of patterns in the data, the system and method described herein use techniques to detect stalls, skips, pauses and quality shifts in the media stream at the user side of the viewing experience. The system and method described herein are intended to provide estimates for each user's quality of experience on a modern Internet media service. The estimates may then be provided or reported to the content provider and/or network provider. The content provider may then review various users' QoE to have a better understanding of user's experience which may aid in explaining and providing insight into user churn.

Generally, the present disclosure provides a method and system for determining the quality of a media stream, and in particular, determining a subscriber's Quality of Experience (QoE) of an encrypted media stream. The method and system are intended to determine quality events that affect the media stream, for example, pauses, stalls, upshifts or downshifts in quality (for example, image quality) and the like. The embodiments herein are intended to address problems that were identified in conventional solutions for determining QoE. For example, not all stalls or downshifts of quality of media streaming will equally affect a subscriber. Many of the examples described herein relate to video streams. It will be understood that similar examples could be provided for audio streams or other types of time/sequence sensitive data. For example, for many quality events, the audio buffer may be handled similarly to the video buffer and the audio buffer can be reviewed to determine whether there were pauses, stalls or other quality events with respect to the audio. In a particular case, for example, if the audio buffer runs empty the system and method herein may consider a quality event occurring, for example a stall in the media stream. Techniques described herein may apply to both encrypted and unencrypted videos. It will be understood that conventional methods for determining quality events in unencrypted videos may not always be applied directly to encrypted videos.

Generally, the system and method detailed herein are intended to determine how the quality event has affected the quality of the media viewing experience and may further determine other factors related to the media viewing, for example, subscriber's device, subscriber's expectation, or the like. The system and method are intended to produce a quantified score of the subscriber's quality of experience that can be provided to the content provider or network provider in order to determine possible actions to better the media viewing, if required.

The method described herein is intended to review media information during the media streaming and after the media has been played to determine the quality of experience. It will be understood that although the method may not operate in real-time, the method is intended to run during the streaming of the media and the results may be timely associated with the individual media stream.

When dealing with network communication, it is easy to get lost in the pure volume of metrics available. Too often packet-level metrics are used in conventional systems to define an estimated user quality of experience. On the other hand, content providers are diligently creating products that transcend poor network performance and momentary network events in order to deliver the best viewing quality. With conventional Quality of Experience methods, it has been a goal to create a quality of experience score that represents the user's experience with a service. While conventional systems try to use latency timings, round trip times and the like to model a user's experience, it was noticed that a user cannot see latency, and as such, these measures may not actually affect the user's QoE. Further, the user may not understand or have visibility into what a poor round trip time looks like. Packet jitter may also have no visual representation that affects the user's quality of experience. To this end, the Quality of Experience method and system are intended to improve upon conventional systems by relying upon viewable characteristics (characteristics that are perceived by a user). The scores provided as a result of these viewable characteristics may include media streaming events such as, quality upshifts and downshifts, the number of buffer stalls, their duration and the amount of time before a video starts.

In the following disclosure, the system and method detail how to detect events related to the viewable characteristics that may be used to calculate the quality of experience score and how to interpret those events. It is intended that the method and system provided herein have moved beyond a conventional metrics-based approach to calculating a more relevant quality of experience for video and audio streaming.

FIG. 1 illustrates an example of a network 10. A plurality of subscribers 12, or video service users, access the Internet 14 via a service provider's network 16. A service provider, for example an Internet Service Provider (ISP), provides Internet access to the plurality of subscribers 12 in order for the subscribers 12 to access video content from a video service provider 18, for example, Netflix™, YouTube™, Hulu™, Amazon™, or the like. The service provider network 16 may be a wireline access network or wireless network.

The service provider network 16 may be operatively connected to a data center 20 which may include network equipment 22, for example, network switches, routers, deep packet inspection equipment and the like. The data center 20 may further include a system 100 for determining video quality, which may receive packets from the network equipment 22 to inspect in order to determine packet information as explained in further detail below. The video service users may request a video from the video service provider 18. The request may be routed through the service provider network 16 and service provider data center 20 prior to reaching the Internet 14. The Internet may direct the request to the video service provider 18 which may then send video response packets through the Internet to the service provider data center 20. Once at the service provider data center 20, the response packets may be replicated to the system 100 for determining video quality, or may be sent through the system 100 for determining video quality prior to being directed to the subscriber 12 via the service provider network 16.

Figure 2:
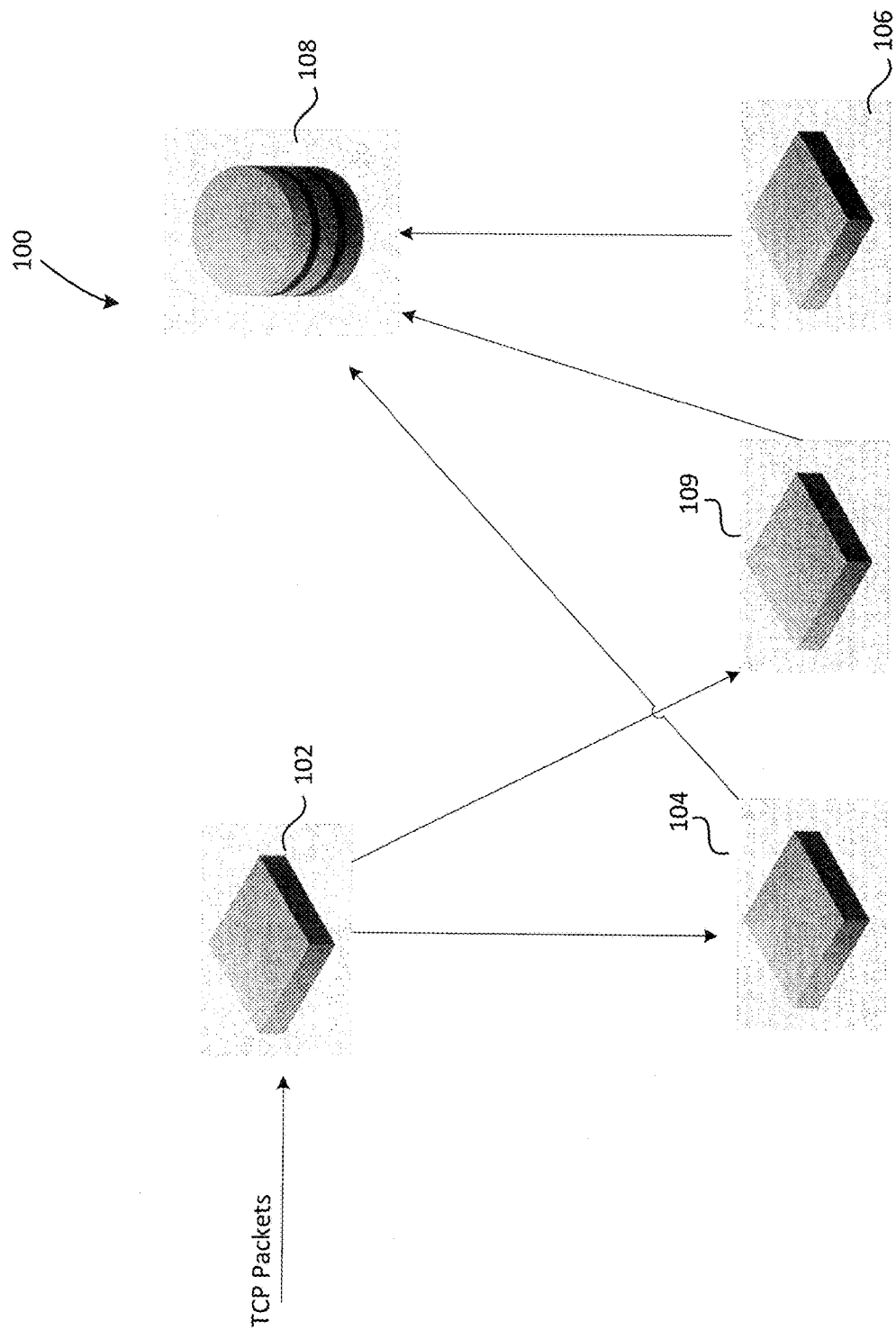
FIG. 2 illustrates a system for video quality according to an embodiment.

FIG. 2 illustrates an embodiment of the system 100 for determining video quality in further detail and illustrates an example packet flow through the system. The system 100 includes a media stream recognition module 102, a quality event handler 104, a quality calculation module 106 and a device identification module 109. The system 100 may further include a memory component 108, which may be included as part of the system or may be accessible by the modules of the system 100. Although the system described below relates to a video stream, it will be understood that a similar system may be used for audio streaming or the like.

The media stream recognition module 102 detects packets within the Transmission Control Protocol (TCP) stream or media flow that may contain streaming data and determines attributes of the media flow. The media stream recognition module 102 transfers data relating to recognized media streams, for example, a video identification (id) and associated attributes of the media flow, to a quality event handler 104. The media stream recognition module 102 may include a processor and a memory component or may be operatively connected to the memory component 108. In some cases, the media stream recognition module 102 may be distributed over more than one network device.

In some cases, the media stream recognition module 102 may determine the stream is media related through review of the SNI which would provide the media stream recognition module 102 with the Content Data Network (CDN), which are used by many content providers. In other cases, the media stream recognition module 102 may determine the traffic flow is related to media via heuristics, for example, the media stream recognition module 102 may determine that the traffic stream is related to media by determining the way it is transmitted, how frequently packets are sent, the size of the messages and the like.

The system 100 may include one or more quality event handlers 104, for example, these may be one for each event of type of event, one for each content provider or the like.

Events are associated with a video id and records are created containing details of the events to be used in the analysis described herein. Each quality event handler 104 may include a processor and a memory component or may be operatively connected to the memory component 108. In some cases, the plurality of quality event handlers 104 may be distributed over more than one network device. The quality event handlers 104 are configured as described herein to recognize events in each video stream being monitored. The quality event handlers 104 are configured to recognize the occurrence and length of stalls, pauses, skips as well as quality shifts. The memory component 108 is configured to store records associated with video events for each video stream.

The system 100 may further include a quality calculation module 106. The quality calculation module 106 reviews the data from the records associated with each video stream and evaluates a video QoE on a per video basis based on predetermined metrics. It will be understood that the calculation module 106 would include a processor capable of providing the calculations as directed by the quality calculation module 106.

The system 100 may further include a device identification module 109. The device identification module 109 is configured to determine device type and device parameters with respect to the subscriber's device parameters. In some cases, the device identification module 109 may use, for example, a system and method such as that described in U.S. patent application Ser. No. 14/135,994 which is hereby incorporated by reference. It is intended that the device identification module determine the type of device and at least one parameter related to the device and media streaming, for example, the user's display size, the user's display maximum resolution, the user's display preferred resolution, and the like. It will be understood that the device type and device parameters may contribute to the determined media QoE determined by the system 100.

Although described as separate modules herein, it will be understood that the modules of the system 100 may be integrated and combined in various ways or may be stand-alone modules. The modules detailed herein are intended to aid in measuring the quality of experience for media streaming and are used to explain the flow of information and processes in the system and methods and may not be required to be separate modules, for example, in some cases, the video stream identification and event identification may be done by a single module and the single module may relay information to a calculation module.

Figure 3:
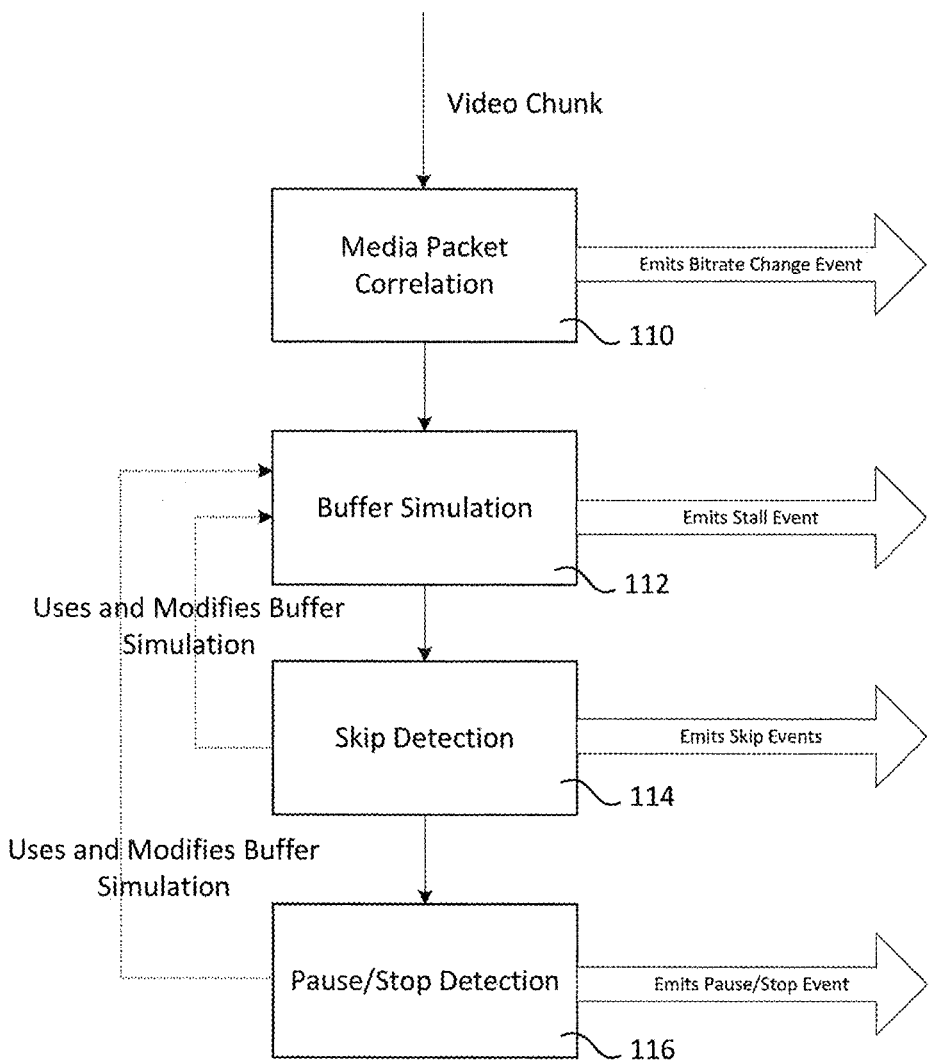
FIG. 3 illustrates an embodiment of a quality event handler according to an embodiment.

FIG. 3 illustrates an example of the event handler 104 in further detail. Each event handler 104 may include a plurality of sub-modules configured to review and determine various aspects and quality events related to the media stream. The event handler 104 may include a media packet correlation module 110, a buffer simulation module 112, a skip detection module 114 and a pause/stop detection module 116. A portion of a video in a video stream, often referred to as a video chunk, is received by the event handler 104 and may be reviewed by the media packet correlation module 110. The media packet correlation module 110 may determine characteristics associated with the video chunk, for example, correlate the video chunk with a video id, determine whether there has been a bit rate change with respect to previous video chunks related to the video id, and identify other characteristics associated with the video chunk.

The event handler 104 may further include a buffer simulation module 112. The buffer simulation module 112 may simulate the buffer of the media player and determine when the buffer is accumulating data, when it is in a steady state and if the buffer experiences a stall event. If a stall event is noticed, the buffer simulation module 112 will emit or notify a stall event to the event handler 104.

The skip detection module 114 is configured to determine whether the media player has experienced a user initiated skip or seek event during the media streaming. The skip detection module 114 may review the media stream shortly after the media stream has concluded or merely in a slight delay as the media stream is playing. Having a slight delay in the review allows the skip detection module 114 to determine whether a skip or a seek occurred. If the media stream was reviewed only in real-time, the seek event may be overlooked and/or determined incorrectly to be a stall. If a seek event is detected by the skip detection module 114, the skip detection module will emit or notify a seek event to the event handler 104. It will be understood that the skip detection module 114 may use the buffer simulation from the buffer simulation module 112 and may modify the buffer simulation based on quality events determined by the skip detection module 114.

The pause/stop detection module 116 is configured to determine whether there were any user initiated stops or pauses during the media streaming. If a stop or pause is detected the pause/stop detection module 116 will emit or notify a pause/stop event as a quality event to the event handler 104. It will be understood that the pause/stop detection module 116 may use the buffer simulation from the buffer simulation module 112 and may modify the buffer simulation based on quality events determined by the pause/stop detection module 116.

The quality events emitted or notified by the sub-modules of the quality event handler 104 are sent to and reviewed and analyzed by the calculation module 106. The calculation module 106 then reviews the quality events to determine a QoE score to be associated with the viewer's experience of the associated media stream as detailed herein.

In the mid 90's companies like Microsoft™, RealNetworks™ and Macromedia™ dominated the video streaming space. Concerned primarily with problems like how to stream watchable video over 56 k modem lines, these companies created various proprietary solutions primarily based on User Datagram Protocol (UDP) transport technology. However, as the amount of HTTP traffic on the Internet increased, various UDP transports found themselves blocked by firewalls, and users became tired of maintaining a number of browser plugins, a new technology emerged: HTTP-based adaptive streaming.

HTTP Adaptive streaming allows the content provider to stream each video at many quality levels, which can be housed on large reliable Content Delivery Networks (CDNs). When an HTTP Adaptive video is played, the player (on the client side) requests a short chunk of video (generally between 2 and 10 seconds) at a given bitrate (quality level). Depending on the current network conditions, the next chunk may be requested at a higher bitrate, a lower bitrate or the same bitrate. In this way the media play can continually change quality levels to adapt to changes in the network to allow the video to continue playing. In some cases, this provides for a change in quality level of the video which is intended to ensure that even if the network is congested, the video continues to play smoothly while always providing the best quality for the applicable network conditions.

Figure 4:
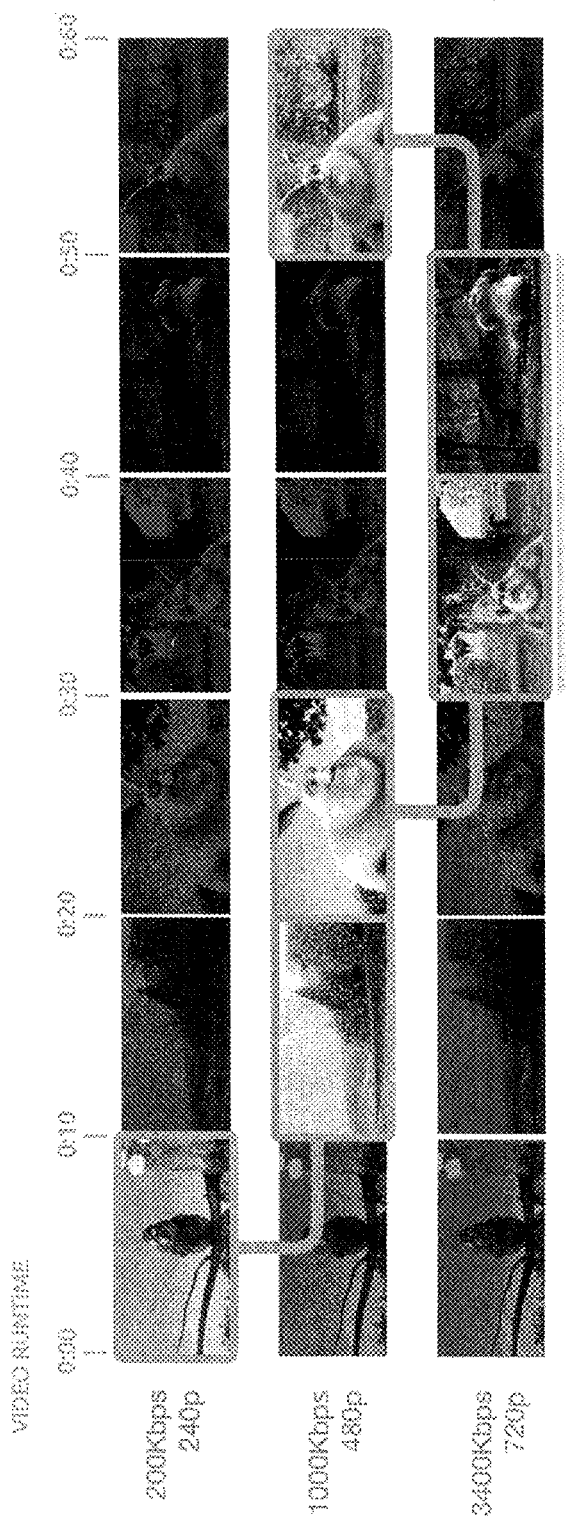
FIG. 4 illustrates an example video stream.

FIG. 4 illustrates a movie switching between bitrates as it downloads 10 second chunks and analyzes the available bandwidth to determine at which bitrate it should download the next chunk. Many of the major content providers currently deliver their video over HTTP. While the standard the content providers use varies, the basic concepts remain similar. Examples of Video over HTTP implementations are: Apple's HTTP Live Streaming (HLS), Adobe's HTTP Dynamic Streaming (HDS), Microsoft's Smooth Streaming, and the MPEG DASH™ (Dynamic Adaptive Streaming over HTTP) Standard. Out of these implementations, DASH™ is the newest may become a leader for the foreseeable future as Adobe™, Microsoft™, and Apple™ are all contributors to MPEG™ and the DASH™ standard.

In order to provide a user centric value for Quality of Experience certain components may be used in the calculation of a QoE score. Specifically, the system and method disclosed herein are intended to be able to detect at least some of the following events:

Stall Count;
Stall Duration;
Number and magnitude of quality downshifts;
Number and magnitude of quality upshifts;
Length of Time at each bitrate;
Pause occurrence and length; and
Skips forward and backward in video.

Figure 5:
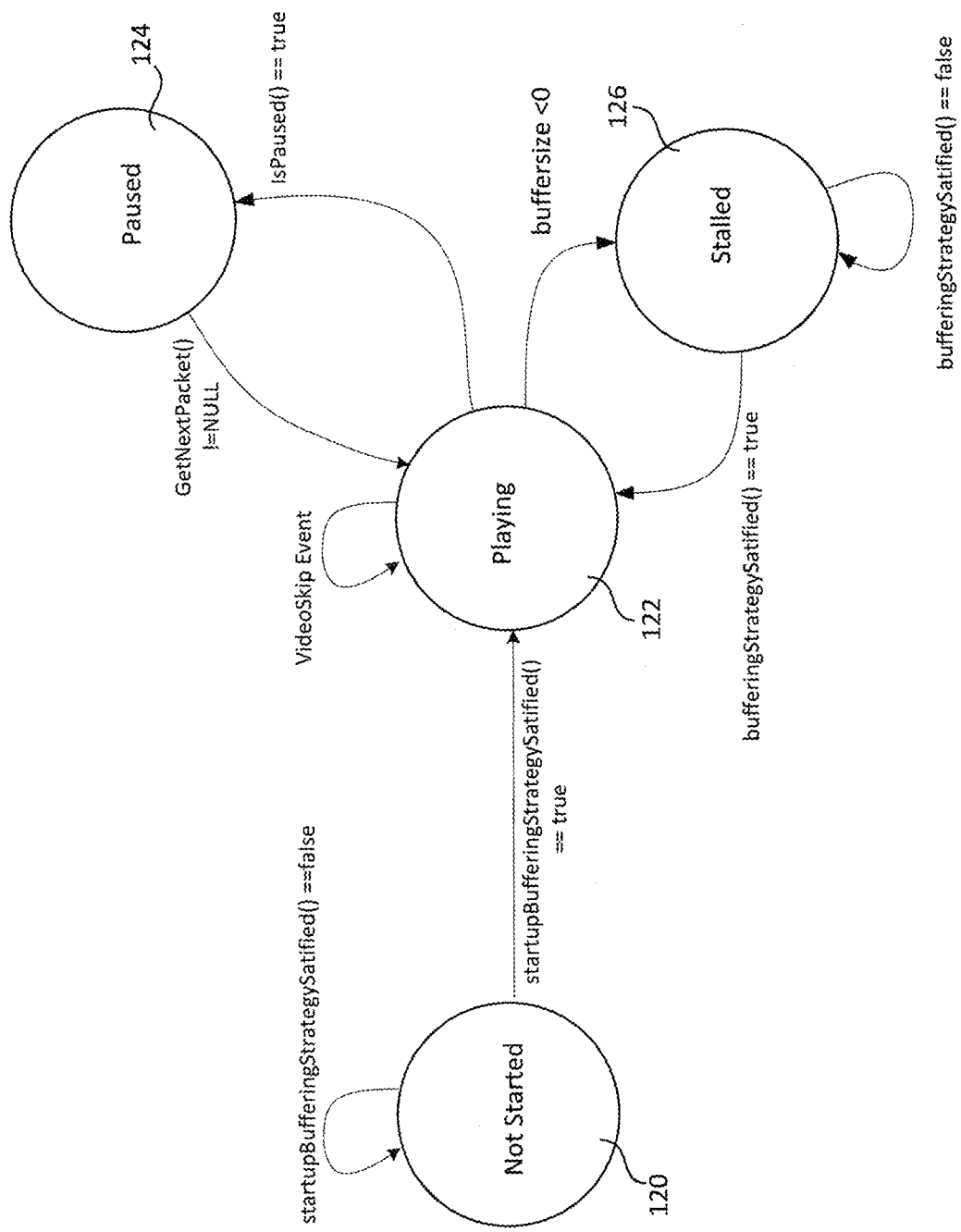
FIG. 5 illustrates a finite state machine indicating various states of a video stream.

FIG. 5 illustrates various states that may be observed during a media streaming flow, for example a video streaming by a user. An initial status 120 may be "not started" which may be assigned to the media stream once the stream has been requested but has yet to begin playing. This status may be reoccurring until the media begins playing. Once playing, the status may be updated to "playing" 122. This status may be reviewed and the media stream may continue to have a playing status. From a playing 122 status, the media stream may be moved to a "paused" 124 status or a "stalled" status 126 as detailed below. Depending on the event recognized by the quality event handler 104, the status of the stream may be updated as an event occurs, or may be reclassified on a determination of an event. The media stream may return to playing 122 status once either the user has un-paused the stream or the buffer of the content player has accumulated sufficient data to begin playing the stream. It will be understood that these states are various states experienced by the media stream once it has been selected by a user. The media recognition module 103 determines the state of play of the media stream and processes or stores the state information in order to be used by the buffer simulation or to determine quality events.

A stall may be considered as a period of time when the video player's buffer empties and it has no video available to play. Conventionally, it has been indicated to a user by a "spinner", a spinning icon on the screen. The length of a stall can be considered as the time from when the video player runs out of video to play until the video player has accumulated enough video to begin playing again. The way the player determines the amount of video which may be buffered before playback begins is detailed herein.

In order to detect stalls, some of the knowledge about how video over HTTP works is employed by the event handler 104. In an attempt to ensure that video playback is always smooth, modern video streaming services build a buffer into their players. A buffer is an allotment of memory set aside to store video that has yet to be played. It will be understood that an audio player may function similarly. If the player only requested video after a chunk had finished playing, a user would notice that the video would be very jerky as time would be required to download each next chunk before that chunk could be played. Moreover, any small network event that somehow limited bandwidth would lead to longer or more frequent stalls. In order to combat this, a player will download a certain amount of video before it starts playing and continue to download chunks in the background, which is intended to allow for the video to continue to play seamlessly and without stalls. Typically these buffers hold between 30 and 240 seconds of video and it may be possible to observe the buffer size by determining the amount of video that has been played and calculating the maximum number of seconds downloaded compared to the amount played at any given time. At some point, the buffer simulation module 112 may map the amount of video downloaded, and see the video reach a steady state where no or only small amounts of video may be downloaded because the buffer may be considered full as shown in FIG. 6.

Figure 6:
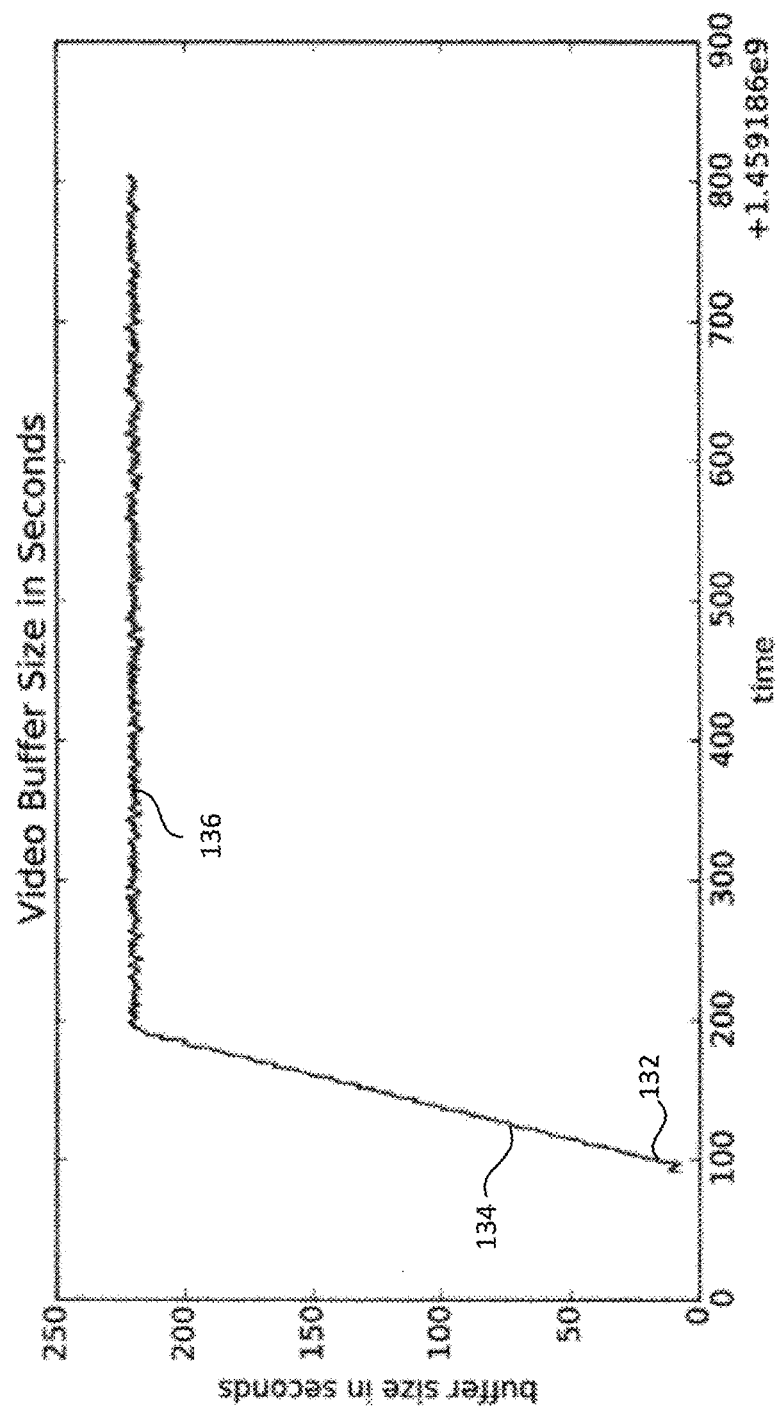
FIG. 6 is a graph illustrating the stages of a video stream.

In FIG. 6, three stages or conditions of video buffering are illustrated, startup 132, accumulation 134 and steady stage 136. The maximum buffer size in seconds, is reached during the steady stage. In this example, the maximum buffer size is 232 seconds. A sizeable buffer like this could generally withstand many network events and poor overall bandwidth for almost 4 minutes before a stall would be noticed by a user. It will be understood that buffers may be larger or smaller in size.

Once the media stream recognition module determines the size of the buffer and the size of video chunk that a video service uses may be considered to determine whether a stall has occurred. It is important to note that due to the way that video encoding works, it is easier to chop a video into chunks based on time rather than size. When a video is encoded, the encoder can specify that a key frame is inserted every x seconds, wherein x is equal to, for example, 2 seconds, 5, seconds, 10 seconds, 50 seconds or the like. The video can then be chopped into pieces on those key frames. Trying to do this based on size in Kilobytes for many different encodings is considered to be many times more difficult and in most cases also less efficient both in encoding time and computational complexity required for playback, as such is rarely used by video players.

It will be understood that audio works similarly to video where chunks are downloaded and stored in their own fixed size buffer. The differences are that audio chunks are usually larger (8-16 seconds) and that only a single audio bitrate (for example, 96 kbps) is used in most cases.

Given that the video and audio are in equal sized chunks (in seconds) per media stream and the buffers are a known size (in seconds) the media stream recognition module 102 is configured to detect requests and responses even though the requests and responses are encrypted. Furthermore, given that audio chunks are at a much lower bitrate and are larger chunks, they can be easily identified by size. Therefore:

(#videoChunksRecieved)(VideoChunkLength)−LengthVideoPlayed=BufferedVideoDuration and (#audioChunksReceived)(AudioChunkLength)−LengthAudioPlayed=BufferedAudioDuration While the system 100 monitors the video stream, the event handler 104 may calculate the size of the audio and video buffer and may determine when the length of buffered video drops to 0 seconds. If the event handler 104 detect this event, the event handler 104 determines that a buffer stall has occurred. Hence by counting chunks and amount of video played the system may accurately determine when buffer stalls occur.

It may also be beneficial to know when the video starts playing again, since the video player will prebuffer some known quantity of data before it begins playing again. Moreover, the quality event detection, for example, the stall, stop and skip detection, detailed herein may also be considered important video events since these actions effect either: how much video has been played (in the case of stops and pauses) or the state and stage of the buffer (in the case of skips, the user may skip past the end of the buffer and require new data to be buffered). Thus, in order to accurately detect stalls in real world scenarios the system 100 is configured to detect and account for ways in which the user may manipulate the video or audio. In some cases, detecting pauses may provide the ability to accurately count the amount of media buffered and subtract the amount of media played.

In order to accurately estimate a user's true experience, it is preferable to know not only when a stall occurred, but at what point it ended. In this way the system is intended to calculate the length of a stall. Was it a long stall that might significantly upset the user? Was it a short stall that a user might ignore when considering quality?

Each provider has a different algorithm for estimating when there is "enough" data in the buffer for the player to resume playing a video. Analysis on the major providers has been conducted in order to provide results for the system 100, that may be stored in the memory component 108. The system and method described herein may base the QoE event calculations on specific content provider predetermined timing results which may be predetermined and stored in a memory component 108. Many content providers resume playback when a set amount of video has been buffered. This can range from 4 to 30 seconds depending on the content provider. Other providers run complex simulations to determine whether another stall will occur over a predetermined period of time at the current throughput speed. These content providers buffer the amount of data that is intended to prevent the stall. In these cases, the system and method may estimate rebuffering either by running the same simulation or by sampling many videos at many different throttled bitrates and forming a table of estimates as to how much data is buffered at a given bitrate before playback resumes. The table of estimates may be stored in the memory component 108 and may be accessed by the event handler 104 when reviewing the buffer simulation or may be accessed by the calculation module 106 when determining the QoE score.

It has been found that the ability to estimate playback resumption is useful in determining stall length. The stall length is a key factor in determining the quality event and how the event has affected the quality of service. Hence, the quality calculation module 106 may estimate when playback will resume on a per provider basis to obtain the most accurate estimate possible.

A further quality event may be a pause in the media stream, for example when the user pauses the stream. When a pause happens, the buffer may be in the steady state or the accumulation state. In either of these cases, the media player will continue to buffer video until the buffer is full. The system is configured to detect various pauses and three cases of pause detection are detailed herein. In two of these cases a pause can be detected, and its time determined, while in the last case the QoE event handler 104 may determine that a pause occurred but may not determine the exact timing the pause occurred.

Figure 7:
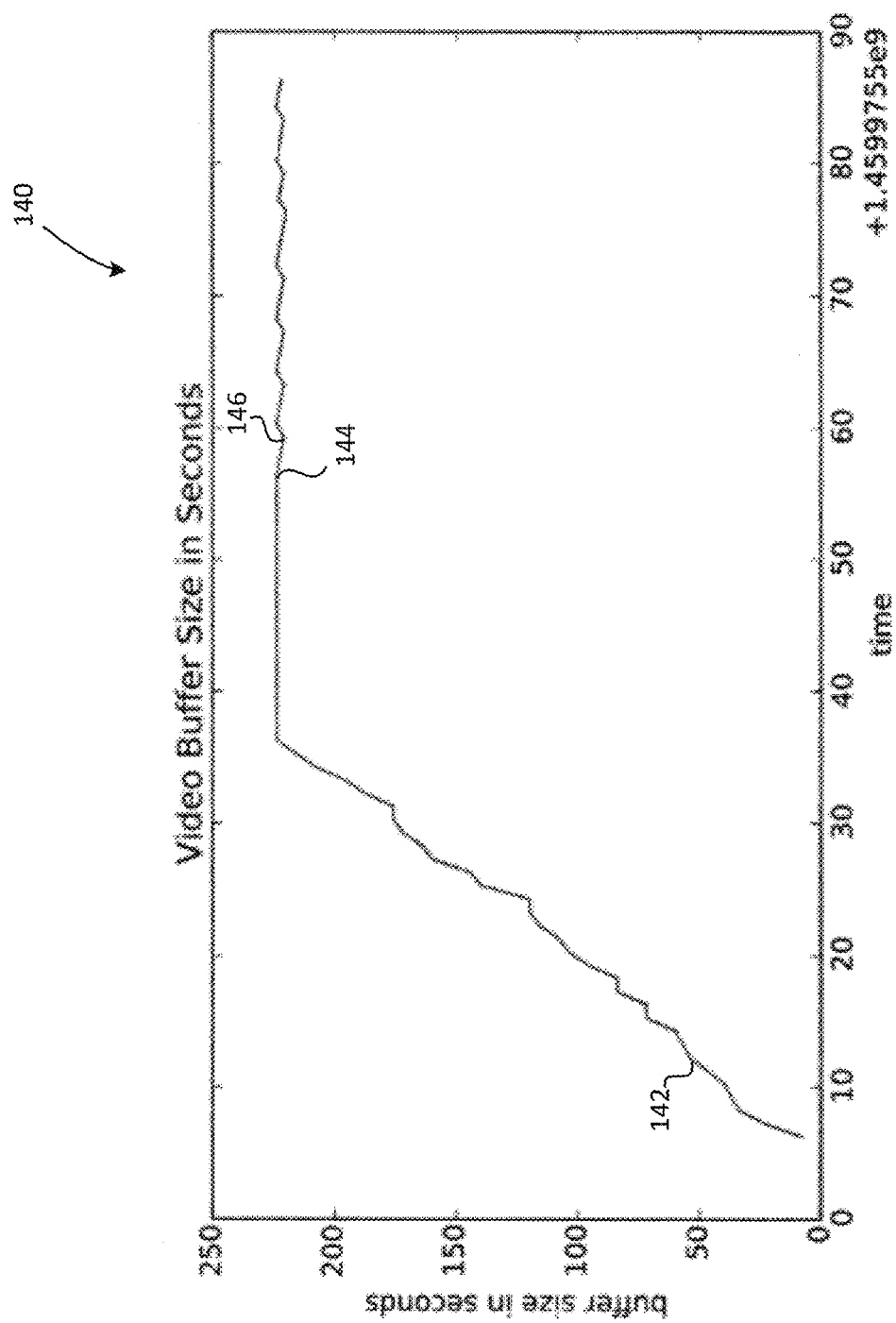
FIG. 7 is a graph illustrating a pause in the video stream.

FIG. 7 illustrates a graph 140 in which a pause 142 occurred in an accumulation phase and playback 144 resumed during the steady state phase, after the buffer has been filled. In this example, the quality event handler 104 may not identify the timing as to when the pause began, because there may be no feedback from the media player and there is no indication with respect to the buffering that indicates that anything has changed. Since the buffer attempts to fill itself, the quality event handler 104 may determine that the pause was within a certain range (for example, since the last time it was full) and in practical terms the time between being in the accumulation phase and the steady state is generally not considered a long period of time with respect to the video length. If one were to estimate that the pause started in the middle of the accumulation stage, the estimate would likely fall within an acceptable margin of error.

On the other hand, the end of the pause can be detected by the quality event handler 104. In this example, the pause ended exactly 4 seconds (1 chunk length) before the first GET 146 that occurred after the buffer is full. The content player is configured to determine that once a chunk of data is played, the content player will buffer another, so once the first chunk has been played (4 seconds of time) another will be fetched. This GET, or fetch request from the content player, will be the first one which has occurred since the buffer has been filled and will indicate that playback resumed one chunk size previous to the current time.

Figure 8:
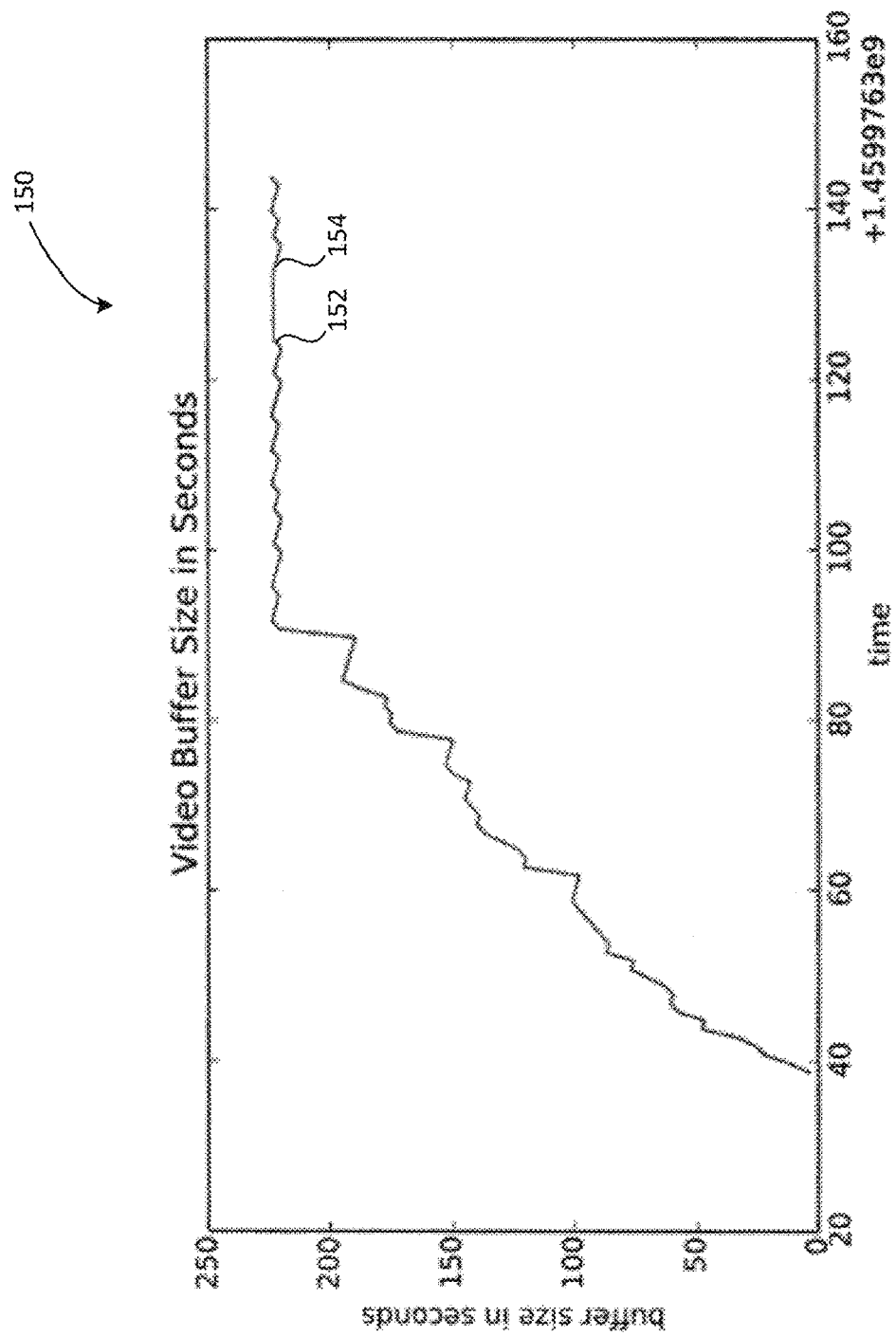
FIG. 8 is a graph illustrating a pause in the steady state of a video stream.

FIG. 8 illustrates a graph 150 of the video buffer in a situation where a pause was detected as starting and ending in steady state. In the steady state, pause detection may be very accurate for both the start of pause 152 and the resumption of playback 154. In terms of playback resuming (end of pause), the quality event handler 105 may use a similar approach as in the previous example. In this particular example, the pause ends 4 seconds before the first GET after a period of inactivity. As in the previous case the start of pause may not be determined exactly, but the quality event handler 104 may achieve a close approximation of the start of the pause 152 based upon the fact that the video was already in steady state. In steady state, the buffer may generally be considered already full or near full. Hence, the quality event handler may determine that the pause appeared sometime in the last few GET's depending on how close the buffer was to full. In practice, it has been observed that the buffer is usually between 1 and 3 chunks from full. So, for example, when a content provider provides a chunk size of 4 seconds, if one were to guess that the pause started 1.5 chunks before the GET's ceased (and buffer became full), in most cases the system would be within 6 seconds of the actual start of pause. It has been determined that this is a very acceptable margin of error. It would be understood that various chunk sizes may be used by different content providers and the estimation may be amended depending on the chunk size used by the content provider.

Figure 9:
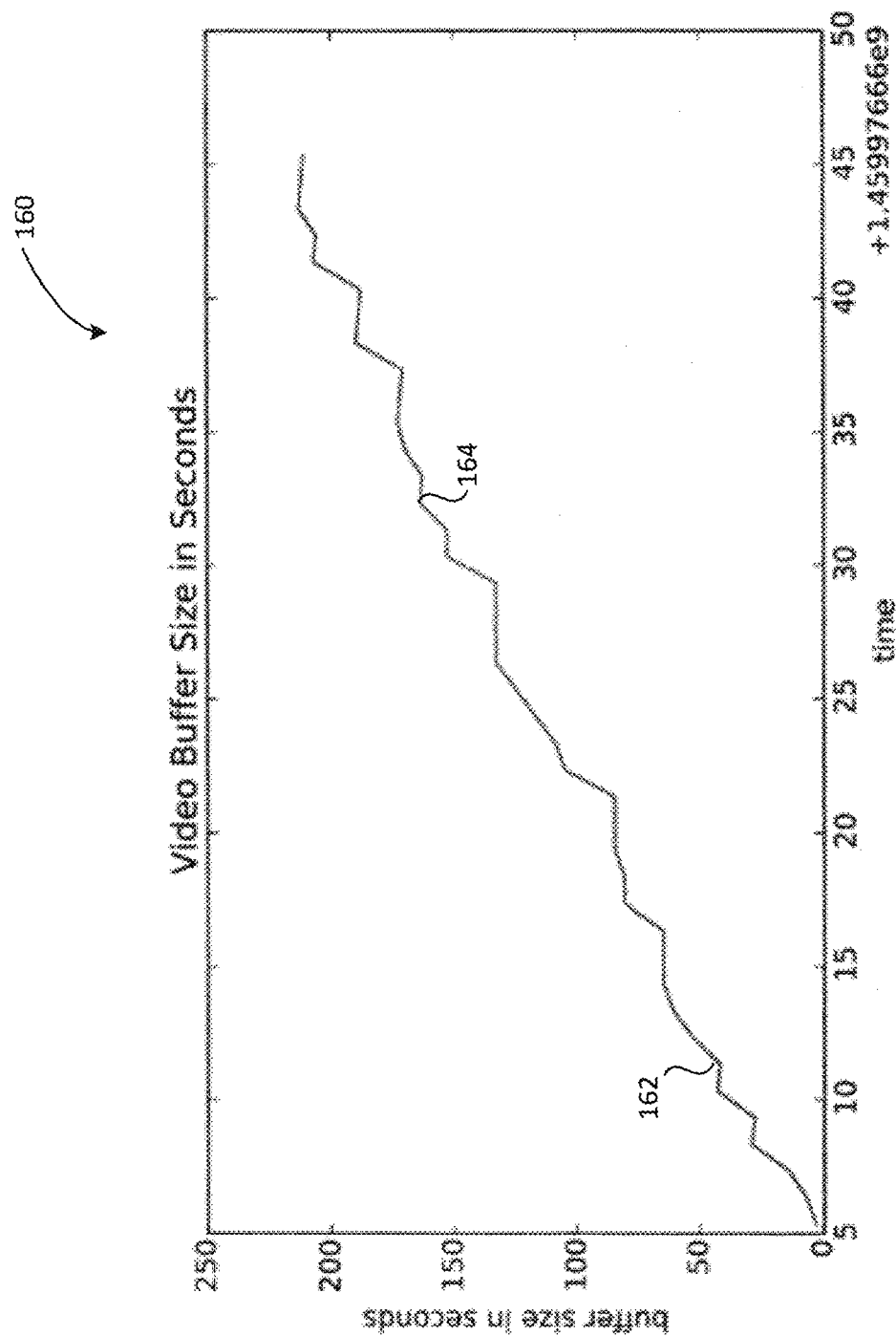
FIG. 9 is a graph illustrating a pause in the accumulation state of a video stream.

FIG. 9 is a graph 160 illustrating a pause during the accumulation phase. When a pause is both started and stopped in the accumulation phase the quality event handler may not detect an exact start point 162 nor an end point 164 of the pause. The quality event handler 104 may not know when the pause starts or stops because the media player does not provide any information about playback. The quality event handler 104 may be able to determine that GETS are happening and the buffer is being filled. One thing that is noticeable in this graph is that the buffer is monotonically increasing. The system can determine that the media player never plays any data as there is never a dip in buffer size. Although the quality event handler 104 may not know exactly when the pause starts or stops, the quality event handler 104 can figure out that there WAS a pause.

As the system is intended to keep track of the size of the buffer and counting seconds of downloaded video, if there is a pause, and the system assumes the video is playing, then the system may come to a point where the assumption may be that more video has played than actually has been played by the media player.

In this case, the buffer will start to behave as if it were in steady state before it should. That is, the media player will only download one chunk at a time (in this example, approximately every four seconds), when the system has determined that the media player should still be accumulating (by the previous calculations). So in the example shown in FIG. 9, with a 25 second pause, instead of steady state occurring around 220 ms, it will appear to happen at 195 ms. This delay signals the quality event handler 104 that in the accumulation phase there was a 25 second pause. However, the quality event handler 104 may not be able to determine the point at which that pause occurred. Although, as the playback spends relatively little time in the accumulation phase, and since video continues to download in the accumulation phase, the relative frequency with which this type of pause will occur is relatively small. Further, as the pause continues to be detected, although the actual start and playback of the pause may not be known, the quality event handler 104 can still ensure the pause is recorded and stored in connection with the media stream.

Figure 10:
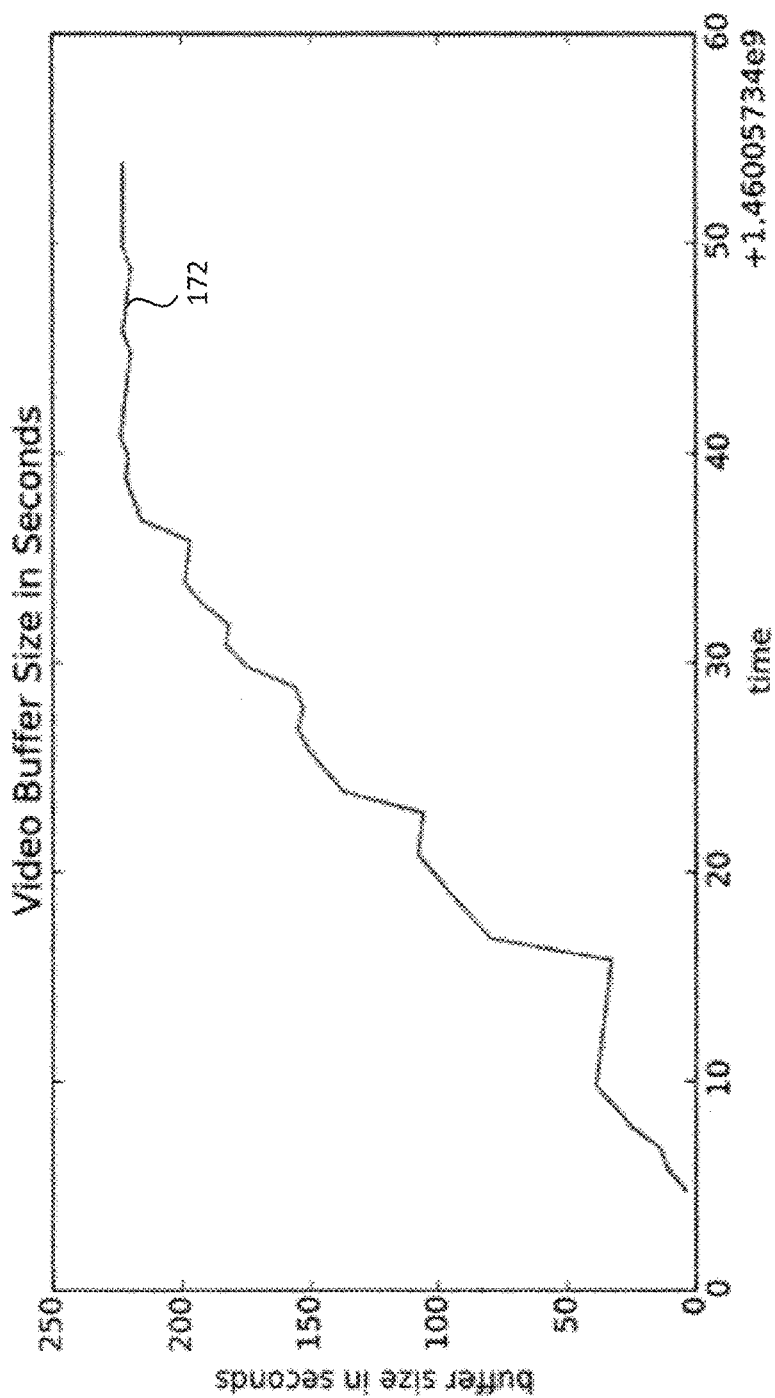
FIG. 10 is a graph illustrating a stop in the steady state of a video stream.
Figure 11:
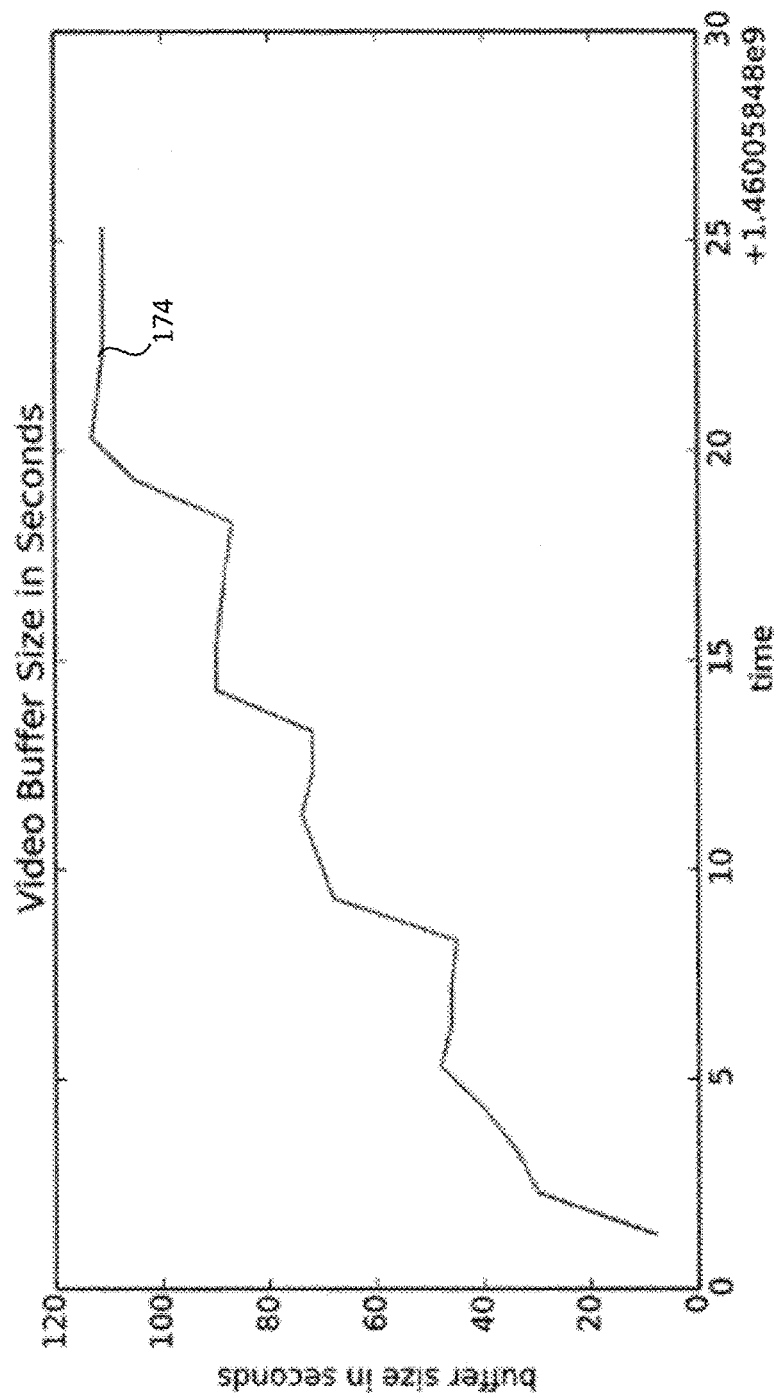
FIG. 11 is a graph illustrating a stop in the accumulation state of a video stream.

A further quality event may be a stop. A stop 172 can occur in the steady state phase as shown in FIG. 10 or a stop 174 may occur in the accumulation phase of the media stream, as shown in FIG. 11. In either state, the quality event handler 104 is intended to be able to detect the stop. The system may see the currently executing GET complete, and then no further GET's related to the video will occur. If no other video streams can be associated with a video then the system 100 may assume no other GET happened. Unfortunately a very long pause that times out may also look like a STOP as the TCP streams time out. In this case, the system may in fact detect two separate videos. Should this happen, the system may assess these as two separate videos and analyze the QOE as such. It has been found that this approach continues to yield results very close to those that would be attained if the whole video was evaluated as a single entity.

Figure 12:
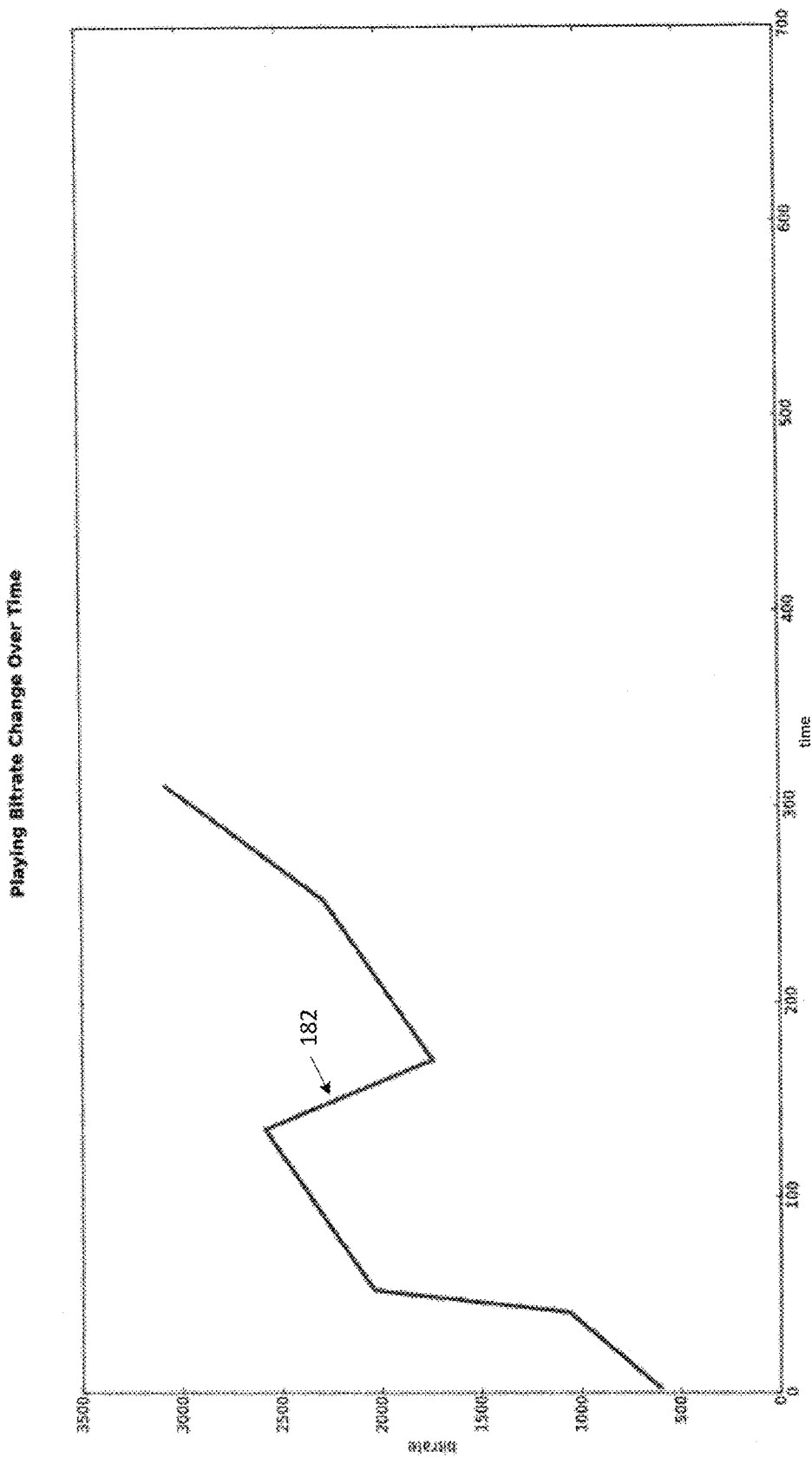
FIG. 12 is a graph illustrating bitrate change when there is a seek in the video stream.

Another quality event intended to be detected by the system would be a seek event. Like pauses, the system 100 may be able to identify when a user seeks forward or backwards through a video. The system is intended to track seek events because the seek event may lead to a rebuffering event, and during this rebuffering event, the current bitrate will likely drop in order to frontload the buffer for continuous play. If this is the case, then the seek event may incorrectly be identified by conventional systems, as a bitrate downshift 182 may be observable as shown in FIG. 12.

The bitrate downshift 182 may indicate the point at which a seek occurred and the content player began rebuffering the media stream at a lower bitrate. To the upshift/downshift detection method, this may appear to be a large downshift and, even with a curve of best fit, would be penalized as an indicator of quality degradation. Hence, the quality event handler may consider the seek events when determining if an actual downshift occurs. Moreover, even though a rebuffering event will occur, the rebuffering event is unlikely to impact User QoE. The user would likely be expecting a rebuffering event when he/she skipped the video, hence, this rebuffering should not count against QoE so long as it completes in a timely manner.

In some cases, a predetermined threshold may be used to determine whether the rebuffering completed in a timely manner. The predetermined threshold may be 5 seconds, 10 seconds, 30 second, or the like and may be amended per content provider and per network quality. As the content delivery network improves the predetermined threshold may be reduced. The predetermined threshold may also be variable depending on the video quality and the distance skipped by the user. If the system determines that the rebuffering time for the media player was over the predetermined threshold, then then rebuffering would be noted as negatively affecting the QoE, while if the rebuffering time was under the predetermined threshold, the rebuffering would not be considered to have negatively affected the QoE.

Detecting that a seek event occurred is intended to make use of two pieces of data: a calculated buffer size and bitrate of the transmitted chunks. It is intended that the quality event handler 104 has access to this data, through either querying a memory component or stored locally while monitoring the media stream. The quality event handler may determine that a seek occurred when the simulated buffer grows to more than the maximum buffer size.

For example, if x=simulated buffer size−maximum buffer size, then if x<maximum buffer size then the quality event handler can determine that the user seeked forwards or backwards an amount where part of the current buffer could still be used. That is to say, the content player did not need to dump the whole buffer and start again.

If x>=maximum buffer size, then the user seeked past any buffered data, and the whole buffer had to be rebuffered. In this case, the quality event handler 104 may not determine how far the player seeked, merely that it was further than the buffered data. In general, it is not important to know how far the player seeked as if the user has seeked past the buffer length, the full buffer will be refilled, As such, if the buffer is 240 seconds, a user skipping 241 seconds will experiences the same results as a user skipping 300 or 3000 seconds of the media.

In these cases, the buffer may take time to reach a steady state again before measuring the size of the seek, otherwise the quality event handler 104 may not determine how far the user has seeked, and may in fact count too many seeks if it detects a seek too early. Thus, it may be preferable for the quality event handler 104 to determining seeking after the fact instead of being calculated in real time. Furthermore, if a player seeks many times while rebuffering, the quality event handler 104 may not know how many seeks occurred. However, the quality event handler 104 may determine that it would require multiple seeks to have a value of x such that x>maximum buffer size.

The main purpose of identifying a seek is to rule out large bitrate drops due to seeking. However, it should be noted that based on instantaneous throughput, amount of video buffered and other network factors used by the content player, there may not be a drop in bitrate due to seeking. In fact, by the very nature of seek detection, the quality event handler 104 may not determine when the seek occurred, and may instead determine that it happened between a steady state at a certain buffer level, and another steady state at an even higher buffer level. In practical terms, identifying the exact time at which a seek event occurred may not be necessary. What the quality event handler 104 can do however is use the knowledge of the seek and the window in which it occurred to smooth out the bitrate graph for a section where a seek did occur. That is to say, if the system determines a time interval in which a seek occurred, the calculation module 106 may neutralize all large down shifts happening in that time interval.

Another quality event detected by the system would be a quality upshift or downshift. As all chunks are the same length (in seconds), and the system is configured to determine how many bytes are received per request, detecting the current quality level may be as follows:

$$\text{Bitrate}(kbps) = \frac{\text{Data Fetched}(kb)}{\text{Length of chunk}(s)}$$

Hence if the content player has requested to fetch 2400 kb of data for 4 seconds of video, the current bitrate is 600 kbps. It is important to note that this is an instantaneous bitrate, and due to variable bitrate encodings, the size of individual chunks may be smaller or larger than the current bitrate, so the system may average the instantaneous bitrates that are calculated. For instance, if the system reviews 4 chunks, with instantaneous bitrates: 480 kbps, 510 kbps, 520 kbps, 490 kbps, the calculation module may extrapolate that the current target bitrate is approximately 500 kbps. The system may review at least two chunks to determine an instantaneous bitrate.

In some cases, the calculation module 106 may calculate target bitrates, then the quality event handler may provide for a way to calculating quality upshifts or downshifts. Since bitrates can vary per chunk, the quality event holder 104 may determine a threshold at which a true bitrate shift has occurred. This threshold is intended to be chosen very carefully. If the quality event handler selects a threshold that is too small, then if a chunk varies from the target encoding due to, say, lack of motion over four seconds, it will appear as a downshift. However, if the quality event handler 104 selects the threshold too large, the system may miss bitrate shifts that actually do happen. Each provider may have a different set of target encoding levels, and this threshold may be tuned per content provider. In the common case however, the next highest target encoding bitrate may be approximately 1.5 times the current target encoding bitrate, so the system may have predetermined target encoding bitrates thresholds of 100 kbps, 150 kbps, 225 kbps, 337.5 kbps, 500 kbps, 750 kbps etc.

Whenever the quality event handler 104 determines that there has been a sequence of chunks that are larger than the current bitrate plus the threshold, the quality event handler may count a quality upshift in the media stream. When the quality event handler 104 determines that there has been a sequence of chunks that are smaller than the current bitrate minus the threshold, then the quality event handler 104 may count a quality downshift. In some cases, the counts of upshifts and downshifts may be used as a contributor to QoE. In other cases, more sophisticated techniques to quantify how quality upshifts and downshifts contribute to overall viewer quality of experience may be used to determine an overall change in the QoE.

Figure 13:
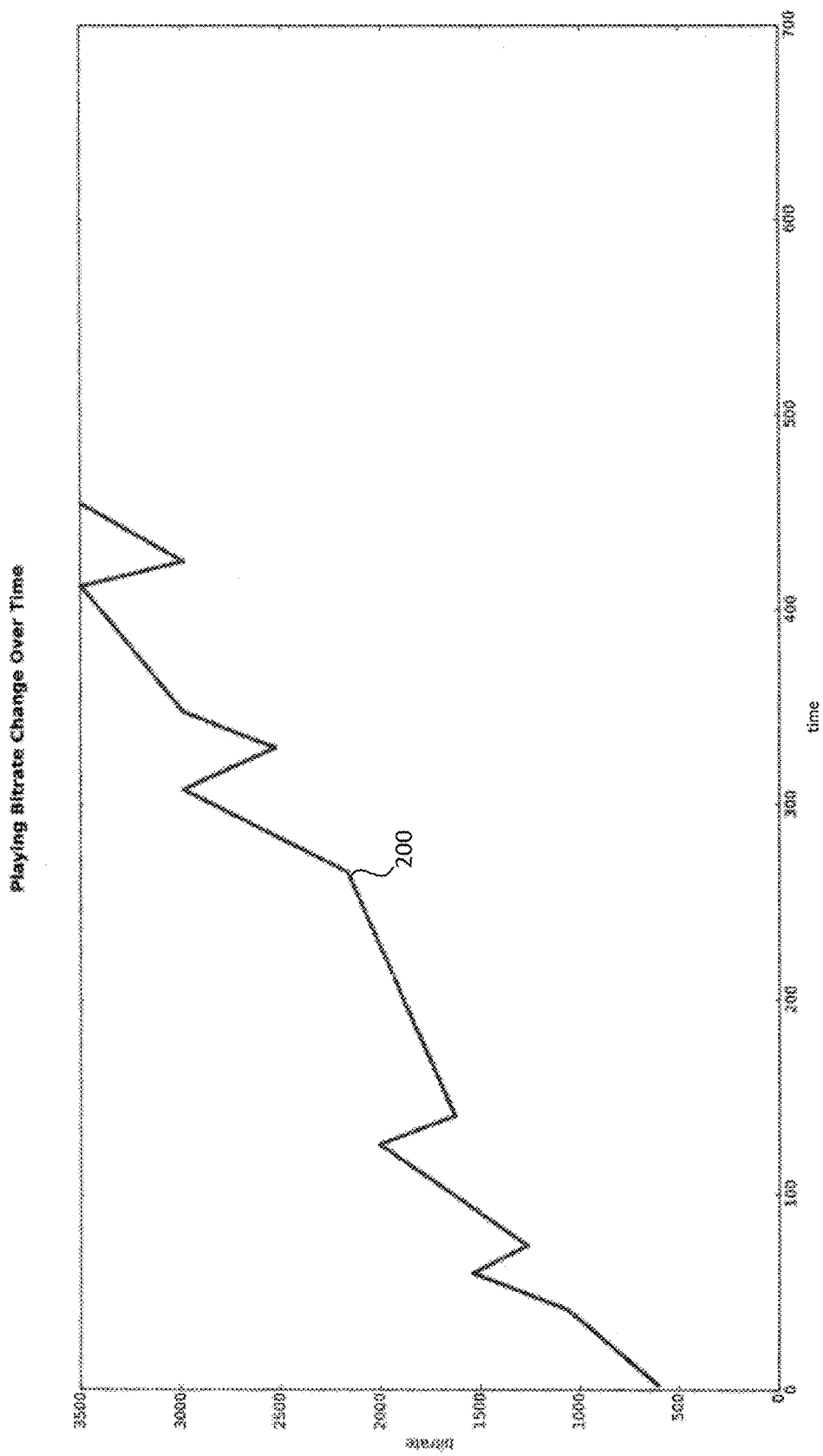
FIG. 13 illustrates an example bitrate change over time for a media stream.

In some conventional cases of consideration of quality shifts, only downshifts were considered. These conventional systems may count downshifts and quantify the viewers' experience based on the number of downshifts they encountered. While this seems logical at first glance, it was determined that in countries and jurisdictions with less reliable internet connections that viewers would frequently see videos with bitrates like those shown in FIG. 13.

Here, as the video approached 1080p resolution (3500 kbps bitrate), there were 4 downshifts as the video player picked the right chunks for the current network conditions. In one case, it might be determined that this was too many bitrate downshifts. In the user's experience however, he viewed a video in very high resolution and he got from its initial Standard Definition playback to High Definition playback in a relatively short amount of time. This begins to illustrate why simply counting bitrate downshifts may not be sufficient to determine quality of experience.

Furthermore, it is intended that the quality event handler 104 may look beyond simply counting of downshifts, consider the fact that the difference between two bitrates might not be resolution but rather the amount of compression involved in the video and the viewer may not notice this difference in compression. That is to say, a video may have encodings at 1250 kbps and 1500 kbps, and they might both be encoded at 720p. The difference would be that the video encoded at 1250 kbps would have slightly more compression, and hence more visual artifacts such as macroblocking than the one at 1500 kbps. Depending on the attentiveness of the viewer, these visual artifacts might not be noticed or might not reduce the user's QoE. It will be understood that a change in bitrate will have a change in compression. A change in bitrate may also include a change in resolution, which is intended to be determined by the system after reviewing heuristics related to the media stream.

Further, there remains some question as to how heavily a long downshift in comparison to a shorter downshift. Further, there were questions relating to how should the system qualify a downshift for one 4 second chunk, after which the media jumped to an even higher bitrate.

Figure 14:
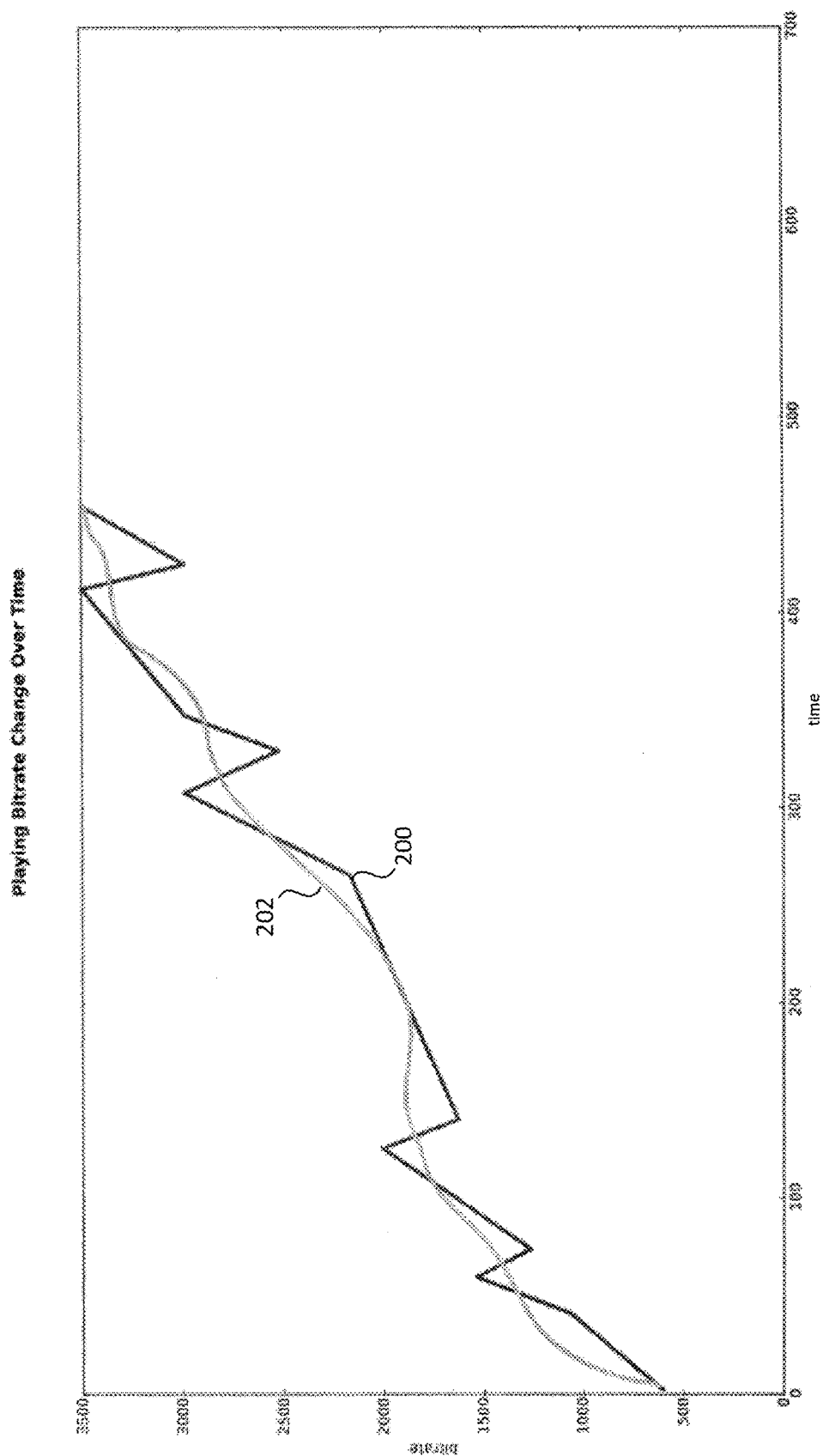
FIG. 14 illustrates a smoothed representation of the bitrate change in FIG. 13.

It will be understood that counting downshifts does not directly answer these questions or address the issues discovered. It was determined that a better solution may be to make use of a curve of best fit. Then the system can take the magnitude of slopes over time to determine the user's actual quality experience while smoothing out the minor imperfections that likely did not significantly impact the viewing experience for the user. With a smoothing overlay of the results graph is shown as FIG. 14, which illustrates the original bitrate 200 and the smoothed overlay 202.

The smooth overlay 202 may be simpler to interpret, and better reflect the user's true experience. By smoothing out minor imperfections the system is intended to better represent actual quality of experience.

It is further noted that not all devices are created equal. A 60 inch television is generally considered a much better viewing platform for watching 4 k video than a smartphone. The user is likely more able to tell the difference between resolutions more easily on a bigger device. The average user will have a hard time differentiating between 720p and 1080p video on the 5 inch screen of a smartphone. As such, the system is configured to weight the difference differently for a large television with pixels that are set farther apart in comparison to a smartphone or smaller screen. In fact the device and delivery network come into play in QoE calculations in many various ways. The device identification module 109 may determine the type of device as well as the make and model, for example an iPhone™ 7 smart phone, a 4K Samsung™ TV, or the like.

Besides just the screen size, and resolution, the device itself can impact video QoE in other ways. Older devices with smaller memory footprints may not be able to hold buffers of the same size as larger devices. On these devices the user may only receive Standard Definition video. This may not be seen as a detriment however, as, the user realizes the device is older and will likely have fewer expectations as to what quality he can reasonably stream.

The system may also consider the network delivering the video when considering quality of experience. When a user is using a cellular network to watch video, he/she is paying for every byte consumed. On cellular networks, overages are expensive and data plans are frequently limited. Therefore a user would want, and expect lower bandwidth video then when he was accessing via a Wi-Fi network. In fact, a user receiving only HD video might penalize the video provider when providing QoE score, since the high quality was not what he expected, and it could lead to a large cellular data bill. Moreover, users understand the kind of network on which they are accessing the Internet. Users leveraging a large shared Wi-Fi hotspot, like ones found at a coffee shop or a mall, often do not expect to receive 4 k video. They will lower their expectations understanding that the network itself is overburdened and slow, which corresponds to having a higher QoE score on lower quality media streaming.

Taking device and network into consideration may complicate the Quality of Experience calculation in some aspects but this information can be important in calculating an accurate Quality of Experience score.

Figure 15:
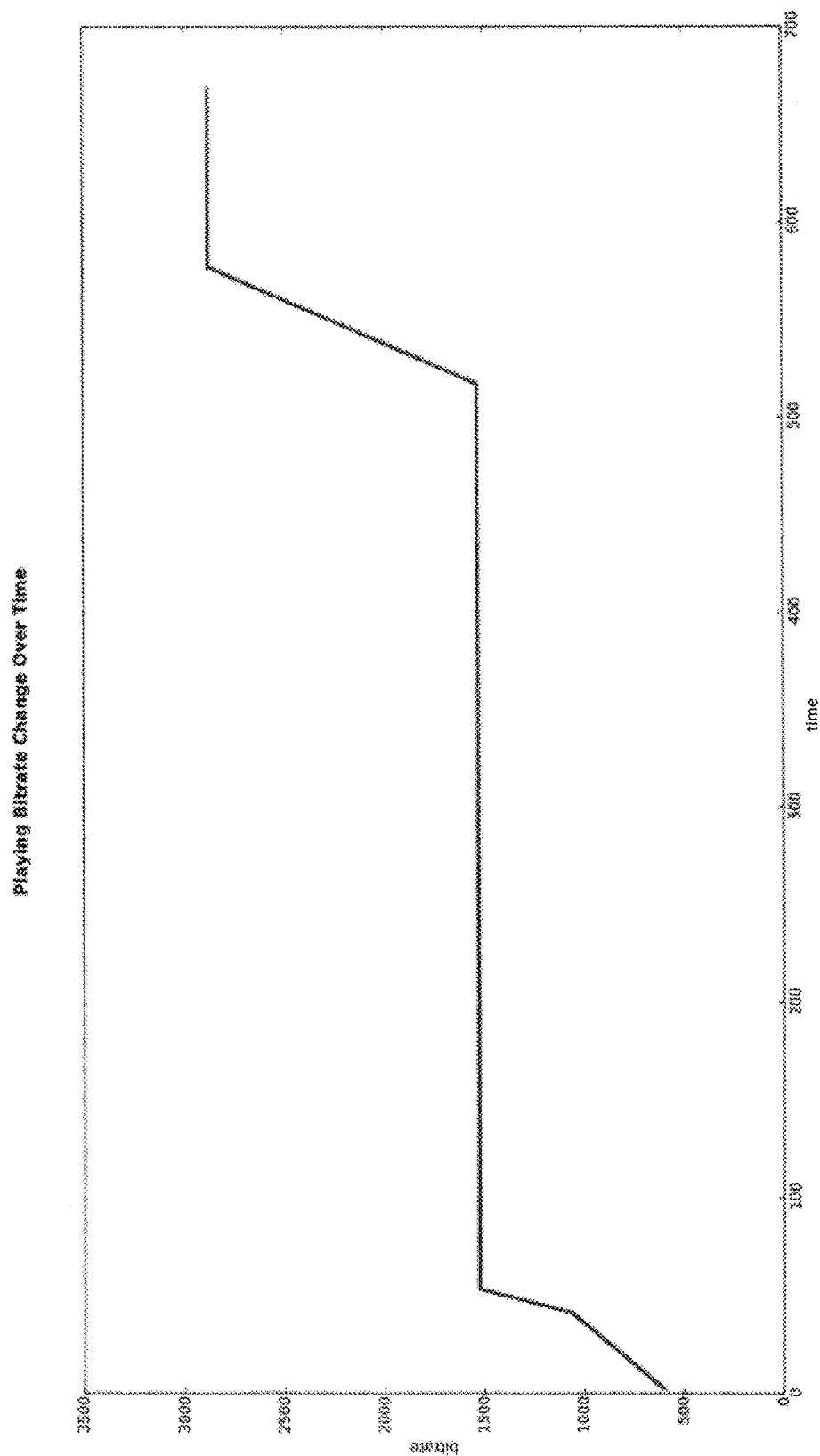
FIG. 15 illustrates another example of a bitrate change over time for a media stream.

In previous and conventional Quality of Experience calculations, the length of Buffer Stalls may have been a component of the calculations and/or the number of downshifts. In order to better model an actual user's experience when evaluating Quality of Experience, the system described herein may consider how long each event lasted. While the curve smoothing provides the system a way to interpret the overall trend of how quality shifts happened in a video, it may also be beneficial to take into account how long each quality shift lasts. FIG. 15 illustrates a bitrate graph that trends upward, however this graph also depicts a video that is viewed at a lower/medium quality for most of its playback. The system 100 may determine whether the trend is sufficient to determine a relatively good QoE score.

Figure 16:
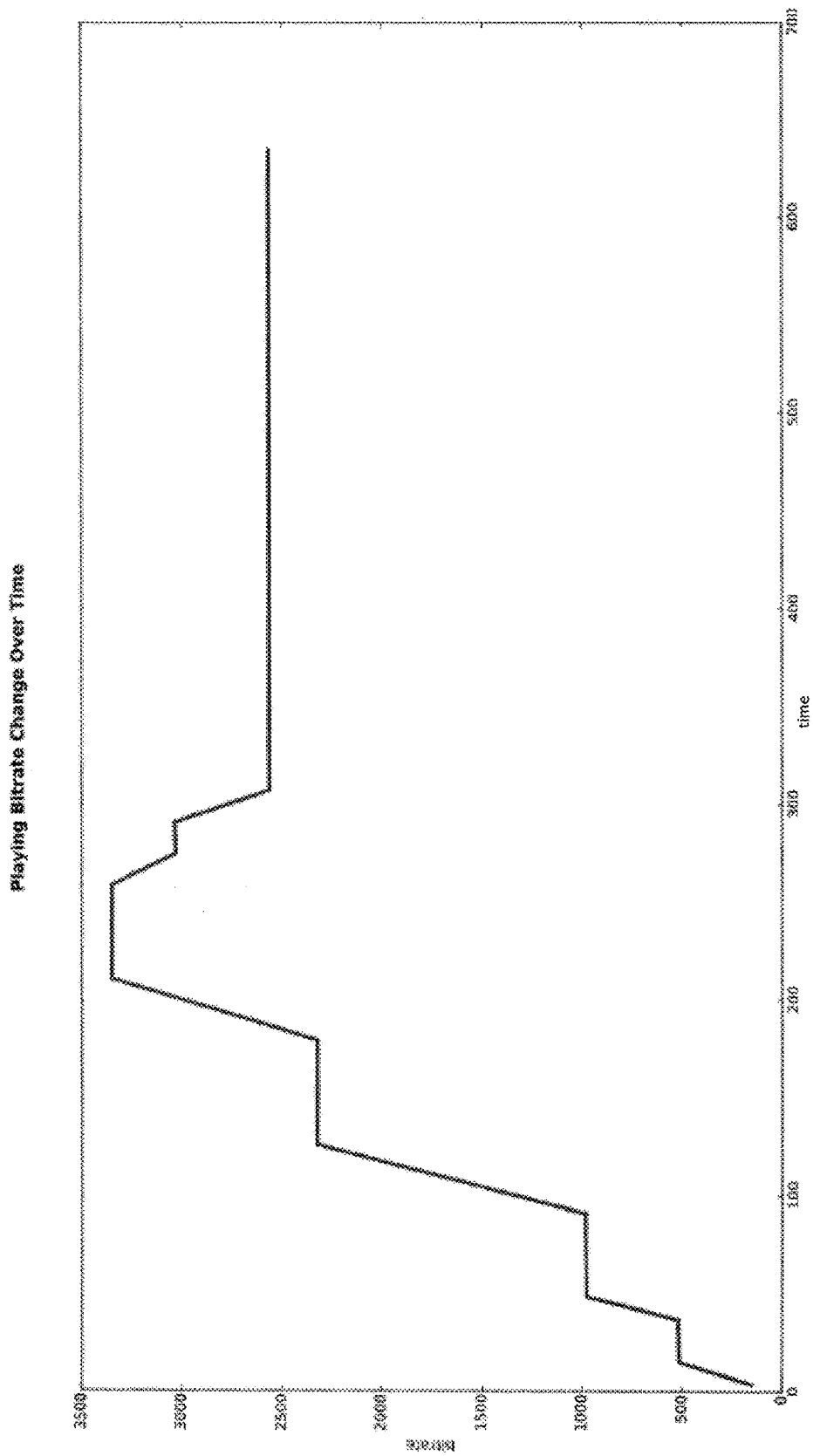
FIG. 16 illustrates yet another example of bitrate change over time for a media stream.

Further, FIG. 16 illustrates a bitrate graph with large upswing and then a set of downshifts which leaves it at good but not great quality for most of its playback.

As can be seen from FIGS. 15 and 16, the duration of playback at each level of bitrate would affect the user's quality of experience. The system 100 is intended to factor in the duration as well as the smoothed curve and determine whether the local maxima map to the users typical experience, which can be determined by the calculation module 106 as detailed herein.

While the system described herein determines or estimates the events which happen in a video playback, the system 100 may also estimate how a human will react to these events. For instance, there is the influence of expected events that the system may wish to consider to determine an overall QoE score. For instance, when a user starts a movie, the video stream essentially stalls while it establishes an initial buffer. A user might tolerate a 30 second pause at this point in playback, while a 30 second pause during the middle of the movie would be unacceptable. It is through observation of previous QoE scores in relation to pauses that the system may determine the maximum acceptable buffer length at the start of a movie for the average user. Further, the system may be constantly retesting these thresholds, as players, networks and Content Delivery Networks improve, the acceptable buffer length at the start of a video may shrink. Likewise, when a user skips forward or back in a movie, he/she may expect to see a stall, but the length of the stall may determine whether the user considers the stall to negatively affect the viewing of the video stream.

Through a series of crowd source tests and through continuing to investigate how users feel about the types of events they see, the length of these events and where they occur in the playback of a video, the system may be able to determine an acceptable tolerance. For instance, a person's QoE score will be less adversely affected by a 10 second buffer stall that occurs at the beginning of a movie versus a buffer stall of identical length that occurs at the end of a movie during the climax.

The system may also determine if the number of buffering events is more significant than a single buffering event. For example, the system can be configured to determine whether 5 stalls of 2 seconds is better or worse than a single 10 second stall.

An initial approach to calculating quality of experience was to make use of a sum of squares. The calculation module 106 calculates the amount of error the quality event handler 104 determined versus the expected user experience. While this is a mathematically valid approach to calculating error it may not capture the way a human truly experiences and feels about a streaming media. It was determined that this approach does not take into account when a stall event or a bitrate event changes, whether the user expected that or how the user felt about quality versus the device he/she was viewing it on or the network he/she was using to view the video. To capture the impact of the quality/timing/duration of events vis-a-vis the expected experience, the system may be configured to apply more sophisticated techniques which are intended to provide more accurate QoS scores.

In order to better map the data collected to the scores a human will provide, the system may be tuned to machine learning. By collecting a significant number of user interactions, the system 100 is able to gather information about the quality events that actually happened during various media streaming and the duration of these events, as well as a QoE score assigned by a human to the particular media stream in question. From this information, the system 100 may determine a model to predict QoE score based on those same or similar events. In some cases, all or a subset of these interactions may be used to go back and test the model.

In previous applications of machine learning, linear regression was used to determine coefficients that applied to the event (stalls, quality shifts, skips and pauses) in a linear equation to calculate a QoE score. Moving forward as more test data is acquired, the system may build even more complex models which will predict Quality of Experience scores more accurately.

The system 100 may also determine other opportunities for machine learning. By running tests where a person can continually track how they feel about the quality of the movie they are watching, the system 100 may develop a procedure to reflect a user's opinion of the events that have occurred up to a given time. That is, the QoE score may be a set of equations, and each equation in the set would be tuned to provide accurate Quality of Experience for a given time interval. In essence, this may provide for the tools to evaluate Video Quality of Experience in real time through machine learning. Machine learning may provide the tools to take the data that has been collected and render the most accurate QoE score possible based on the opinions of actual users.

Figure 17:
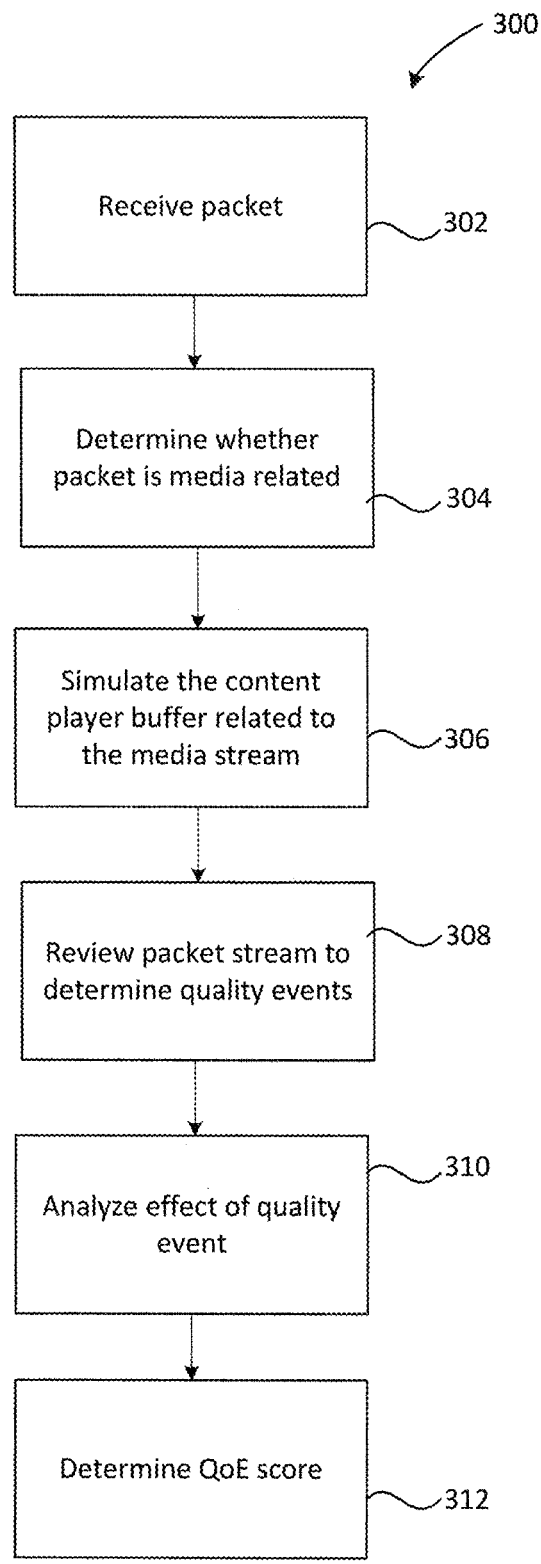
FIG. 17 illustrates a method for determining the quality of media stream.

FIG. 17 illustrates a method 300 for determining quality of a media stream. At 302, the system receives a packet from the traffic flow. In particular, the method 300 is intended to take events that are extrapolated from encrypted streams and mapping the events onto a Quality of Experience score that reflects what a human actually sees.

At 304, the media recognition module 102 determines whether the packet contains media related data. If the packet is media related, the media recognition module 102 will tag the media flow with a media identification and media stream and details will be record for future analysis. If the packet is not related to a media stream, the packet will not be reviewed further by the system.

At 306, the quality event handler 104 simulates a buffer related to the content player. Having a simulated buffer is intended to allow the system to review the changes to the buffer in order to determine quality events associated with the media stream.

At 308, the quality event handler 104 will analyze data chunks associated with the packet stream to determine quality events associated with the media stream. In some cases, a plurality of quality event handlers may review the stream, wherein each handler reviews the stream for a different quality event, for example, skips, pauses, seeks, stalls or the like. In some cases, the quality event handler will determine buffer details as described above to determine whether there has been a quality event.

At 310, the quality calculation module 106 will analyze the various quality events associated with the media stream and at 312, the quality calculation module 106 may determine a QoE score for the media stream. For example, once the quality events, for example the skips, stalls, shifts in quality or the like, are determined by the quality event handler 104, the data may be normalized and then be input parameters, for example, for each type of quality event, for the quality calculation module 106. Each input parameter may be transformed into factors using the formula illustrated below and create two input matrices, a data matrix and a scoring matrix.

In a specific example, the data matrix is intended to express utility thresholds for the parameter. In a particular example with respect to buffer stalls, each stall may be sorted into groups wherein each group is based upon the length of the buffer stall. In the example, the groups may be sorted as dTH={>4 seconds, 2-4 seconds, 1.25-2 seconds, 1-1.25 seconds and 0.5-1 seconds}. The scoring matrix is intended to give a set of quality scores to each of the groups in the data matrix. In this example, the scores may be as follows: 0, 1.5, 3.3, 4.5 and 5. Once the scores have been determined, the following factoring formula may be applied.

$$F = \begin{cases} minScore, \text{ if } data > minScore \\ \left(\frac{maxScore - }{score[i]}\right) + \left(\frac{score[i] - }{score[i-1]}\right) * \frac{(data - dTh[i])}{(dTh[i] - dTh[i-1])}, \text{ if} \end{cases}$$

$$dTh[i] < data < dTh[i+1]$$

The factors may then be transformed into a QoE score. For an adaptive video stream, the media stream may include a set of non-null associated factors S where S includes Adaptive Buffer stall count, Buffer stall duration, Latency, Downshifts and the like. The QoE score of any video record may then be determined by transforming the factors into a QoE score. The QoE score of any video record is then the following:

$$QoE = \left(\frac{5\sqrt{|S|} - \sqrt{\sum_{i \in S} S_i^2}}{5|S|}\right) * 5$$

It will be understood that the set of parameters may be modified from time to time, for example, the parameters may sometimes include downshift duration, smoothed bitrate shifting, or the like. Other calculations may be used to generate a QoE score using the various quality events described above, including using a calculation that weights the various quality events differently depending on the device type or other device details. Still other calculations may consider the QoE a moving target which may be adjusted by the network provider.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

We claim:

1. A method for determining the quality of a media stream of a computer network comprising:
 receiving, at the network, a packet from a traffic flow;
 determining whether the packet relates to a media stream;
 if the packet is related to the media stream, simulating a content player buffer related to the media stream;
  reviewing further data chunks associated with the media stream to determine quality events affecting the media stream, wherein determining a quality event comprises determining a bitrate change comprising:
   determining a target bitrate;
   determining a bitrate of a new data chunk received by the content player;
   determining if the bitrate of the new data chunk is beyond a predetermined threshold away from the target bitrate and
   if the bitrate of the new data chunk is beyond a predetermined threshold away then determining there was a bitrate change, otherwise determining that there was not a bitrate change;
  analyzing the effect of the quality event on a subscriber viewing the quality event; and
  determining a Quality of Experience score related to the media stream;
 otherwise allowing the packet to continue to the subscriber without further analysis.

2. A method according to claim 1, wherein the quality event comprises an event that is perceivable to the subscriber while viewing the media stream.

3. A method according to claim 1, wherein the quality event is a stall, a bitrate change, a stop, a pause or a seek in the media stream.

4. A method according to claim 1, wherein determining a quality event comprises:
 determining a stall event comprising:
  determining an amount of the media stream already played;
  determining when the buffer related to the media stream has emptied;

determining when the media streams restarts playing.

5. A method according to claim 4 wherein determining whet the media stream restarts playing comprises:
   determining when the buffer has accumulated sufficient data chunks to resume playing.

6. A method according to claim 1, wherein determining a quality event comprises:
   determining a pause or stop event comprising:
      determining when the buffer has reached capacity;
      reviewing whether the content player requests further data chunk;
         if no further data is requested, monitoring the content player for the next data chunk request;
         once a new data chunk is requested, calculating the length of time between the last data chunk request and the new data chunk request; and
         determining the length of the pause;
      otherwise, continuing to monitor the data chunk requests from the content player.

7. A method according to claim 1 wherein the predetermined threshold is 1.5 times the target bitrate.

8. A method according to claim 1 wherein the target bitrate is determined by reviewing the instantaneous bitrate of at least two data chunks of the associated media stream.

9. A method according to claim 1 further comprising determining device attributes of the device receiving the media stream and determining the Quality of Experience score based on the device attributes.

10. A system for determining the quality of a media stream of a computer network comprising:
    a media stream recognition module configured to receive a packet from a traffic flow and determine whether the packet relates to a media stream;
    an event handler configured to simulate a content player buffer related to the media stream, wherein simulating the content player buffer comprises:
       reviewing further data chunks associated with the media stream to determine quality events affecting the media stream; and
       analyzing the effect of the quality event on a subscriber viewing the quality event;
    wherein the event handler is further configured to determine a bitrate change, wherein determining the bitrate change comprises:
       determining a target bitrate;
       determining a bitrate of a new data chunk received by the content player;
       determining if the bitrate of the new data chunk is beyond a predetermined threshold away from the target bitrate;
       if the bitrate of the new data chunk is beyond a predetermined threshold away then determining there was a bitrate change, otherwise determining that there was not a bitrate change; and
    a quality calculation module configured to determine a Quality of Experience score related to the media stream.

11. A system according to claim 10, wherein the quality event comprises an event that is perceivable to the subscriber while viewing the media stream.

12. A system according to claim 10, wherein the quality event is a stall, a bitrate change, a stop, a pause or a seek in the media stream.

13. A system according to claim 10, wherein the event handler comprises a buffer simulation module configured to determine a stall event, wherein determining the stall event comprising:
    determining an amount of the media stream already played;
    determining when the buffer related to the media stream has emptied;
    determining when the media streams restarts playing.

14. A system according to claim 13 wherein determining whet the media stream restarts playing comprises:
    determining when the buffer has accumulated sufficient data chunks to resume playing.

15. A system according to claim 10, wherein the event handler comprises a pause/stop detection module configured to determine a pause or stop event, wherein determining the pause or stop event comprising:
    determining when the buffer has reached capacity;
    reviewing whether the content player requests further data chunk;
       if no further data is requested, monitoring the content player for the next data chunk request;
       once a new data chunk is requested, calculating the length of time between the last data chunk request and the new data chunk request; and
       determining the length of the pause;
    otherwise, continuing to monitor the data chunk requests from the content player.

16. A system according to claim 10 wherein the predetermined threshold is 1.5 times the target bitrate.

17. A system according to claim 10 wherein the target bitrate is determined by reviewing the instantaneous bitrate of at least two data chunks of the associated media stream.

18. A system according to claim 10 further comprising a device identification module configured to determine device attributes of the device receiving the media stream and determining the Quality of Experience score based on the device attributes.

* * * * *